US011934538B2

(12) United States Patent
Eldefrawy et al.

(10) Patent No.: US 11,934,538 B2
(45) Date of Patent: Mar. 19, 2024

(54) AUGMENTING EXECUTABLES HAVING CRYPTOGRAPHIC PRIMITIVES

(71) Applicant: SRI International, Menlo Park, CA (US)

(72) Inventors: Karim Eldefrawy, Palo Alto, CA (US); Hassen Saidi, Palo Alto, CA (US); Michael E. Locasto, Lebanon, NJ (US); Norrathep Rattanavipanon, Irvine, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 16/938,664

(22) Filed: Jul. 24, 2020

(65) Prior Publication Data

US 2021/0232695 A1 Jul. 29, 2021

Related U.S. Application Data

(60) Provisional application No. 62/924,779, filed on Oct. 23, 2019.

(51) Int. Cl.
*G06F 21/60* (2013.01)
*G06F 9/30* (2018.01)

(52) U.S. Cl.
CPC ........ *G06F 21/602* (2013.01); *G06F 9/30032* (2013.01)

(58) Field of Classification Search
CPC .................. G06F 21/602; G06F 9/30032
See application file for complete search history.

(56) References Cited

U.S. PATENT DOCUMENTS 9,058,492 B1 *  6/2015  Satish ............... G06F 21/57
2010/0281270 A1 * 11/2010  Miyazaki ............ G06F 21/72
713/189

(Continued)

OTHER PUBLICATIONS

Gröbert, Felix, Carsten Willems, and Thorsten Holz. "Automated identification of cryptographic primitives in binary programs." International Workshop on Recent Advances in Intrusion Detection. Springer, Berlin, Heidelberg, 2011 (Year: 2011).*

(Continued)

*Primary Examiner* — Philip J Chea
*Assistant Examiner* — Sangseok Park
(74) *Attorney, Agent, or Firm* — Shumaker & Sieffert, P.A.

(57) ABSTRACT

In general, this disclosure describes techniques for replacing target cryptographic primitives in executable binary files with other, potentially more secure, cryptographic primitives. In some examples, a computing system for augmenting cryptographic executables includes a locator to determine if an executable program in an executable binary file includes a target cryptographic primitive. The computing system can include a patch generator to generate patch instructions in response to a determination by the locator that the executable program includes the target cryptographic primitive. The patch instructions cause the executable program to execute a replacement cryptographic primitive instead of the target cryptographic primitive. A rewriter engine of the computing system can modify, based on the patch instructions, the executable program to generate a modified executable binary file.

20 Claims, 12 Drawing Sheets

(56) References Cited

U.S. PATENT DOCUMENTS

| | | | |
|---|---|---|---|
| 2017/0116396 | A1* | 4/2017 | Gu .......................... G06F 21/14 |
| 2018/0225109 | A1* | 8/2018 | Stewart ............... G06F 9/44521 |
| 2020/0125735 | A1* | 4/2020 | Bonnefoy-Claudet ...................... G06F 21/577 |

OTHER PUBLICATIONS

Heninger et al., "Mining your Ps and Qs: Detection of widespread weak keys in network devices," in Proceedings of the 21st USENIX Conference on Security Symposium, Security'12, Aug. 8-10, 2012, 16 pp.

Egele et al., "An Empirical Study of Cryptographic Misuse in Android Applications," in Proceedings of the 2013 ACM SIGSAC conference on Computer & communications security, CCS'13, Nov. 4-8, 2013, 11 pp.

Feichtner et al., "Automated Binary Analysis on iOS: A Case Study on Cryptographic Misuse in iOS Applications," in Proceedings of the 11th ACM Conference on Security & Privacy in Wireless and Mobile Networks, WiSec '18, Jun. 18-20, 2018, 12 pp.

Smart, "Physical side-channel attacks on cryptographic systems," Software Focus, vol. 1, No. 2, Dec. 2000, 18 pp.

Zhou et al., "Side-Channel Attacks: Ten Years After Its Publication and the Impacts on Cryptographic Module Security Testing," IACR Cryptology ePrint Archive, vol. 2005, Sep. 26-29, 2005, 34 pp.

Li et al., "K-Hunt: Pinpointing Insecure Cryptographic Keys from Execution Traces," in Proceedings of the 2018 ACM SIGSAC Conference on Computer and Communications Security, CCS '18, Oct. 15-19, 2018, 14 pp.

"Openssl 'heartbleed' vulnerability (cve-2014-0160)," US-CERT, Retrieved Nov. 23, 2020 from https://web.archive.org/web/20141230105124/https://www.us-cert.gov/ncas/alerts/TA14-098A, Original release date: Apr. 8, 2014, 1 pp.

"SSL 3.0 Protocol Vulnerability and POODLE Attack," US-CERT, Retrieved Nov. 23, 2020 from: https://web.archive.org/web/20141230080517/https://www.us-cert.gov/ncas/alerts/TA14-290A, Original release date: Oct. 17, 2014, Last revised: Dec. 10, 2014, 2 pp.

Adrian et al., "Imperfect Forward Secrecy: How Diffie-Hellman Fails in Practice," in Proceedings of the 22nd ACM SIGSAC Conference on Computer and Communications Security, CCS '15, Oct. 12-16, 2015, pp. 5-17.

Stevens, "Counter-Cryptanalysis," Springer, CRYPTO: Part 1, vol. 8042 of Lecture Notes in Computer Science, Aug. 18, 2018, pp. 129-146.

"IDA-Pro/plugins/FindCrypt2," aldeid, Retrieved Nov. 23, 2020 from: https://www.aldeid.com/wiki/IDA-Pro/plugins/FindCrypt2, Last Revised Oct. 22, 2015, 1 pp.

IgNoramus et al., "KANAL—Krypto Analyzer for PEiD," Retrieved Nov. 23, 2020 from: https://web.archive.org/web/20190909170353/http://www.dcs.fmph.uniba.sk/zri/6.prednaska/tools/PEiD/plugins/kanal.htm, Accessed date Sep. 9, 2019, 2 pp.

"Hash & Crypto Detector," apponic, retrieved Nov. 23, 2020 from: https://web.archive.org/web/20200428134643/https://hash-crypto-detector.apponic.com, accessed date Apr. 28, 2020, 6 pp.

Lestringant et al., "Automated Identification of Cryptographic Primitives in Binary Code with Data Flow Graph Isomorphism," in Proceedings of the 10th ACM Symposium on Information, Computer and Communications Security, CCS '15, Apr. 14-17, 2015, 12 pp.

Calvet et al., "Aligot: Cryptographic function identification in obfuscated binary programs," in Proceedings of the 2012 ACM Conference on Computer and Communications Security, CCS '12, Oct. 16-18, 2012, 14 pp.

Lutz, "Towards revealing attacker's intent by automatically decrypting network traffic," Master Thesis MA-2008-08, Jan. to Jul. 2008, 53 pp.

Gröbert et al., "Automated Identification of Cryptographic Primitives in Binary Programs," Springer, in Recent Advances in Intrusion Detection; pp. 41-60, Springer, Sep. 20, 2011, 20 pp.

Zhao et al., "Detection and Analysis of Cryptographic Data Inside Software," Springer, in Proceedings of the International Conference on Information Security, Oct. 26, 2011, pp. 182-196.

Xu et al., "Cryptographic Function Detection in Obfuscated Binaries via Bit-Precise Symbolic Loop Mapping," in 2017 IEEE Symposium on Security and Privacy(SP), May 22-26, 2017, 17 pp.

Hunt et al., "Detours: Binary Interception of Win32 Functions," in Proceedings of the 3rd USENIX Windows NT Symposium, Jul. 1999, 10 pp.

Bauman et al., "Superset Disassembly: Statically Rewriting x86 Binaries Without Heuristics," Springer, in Proceedings of the 25th Network and Distributed Systems Security Symposium (NDSS), vol. 12, Feb. 18-21, 2018, 15 pp.

Anand et al., "A Compiler-level Intermediate Representation based Binary Analysis and Rewriting System," in Proceedings of the 8th ACM European Conference on Computer Systems, Apr. 15, 2013, pp. 295-308.

Wang et al., "Reassembleable Disassembling," in Proceedings of the 24th USENIX Security Symposium, pp. 627-642, Aug. 12-14, 2015, 17 pp.

Wang et al., "Ramblr: Making Reassembly Great Again," in Proceedings of the 24th Annual Symposium on Network and Distributed System Security (NDSS'17), Feb. 26-Mar. 1, 2017,15 pp.

Nethercote et al., "Valgrind: A Program Supervision Framework," Electronic Notes in Theoretical Computer Science, vol. 89, No. 2, Oct. 1, 2003, pp. 44-66.

Luk et al., "Pin: Building Customized Program Analysis Tools with Dynamic Instrumentation," in Proceedings of the 2005 ACM SIGPLAN Conference on Programming Language Design and Implementation, PLDI'05, vol. 40, Jun. 12-15, 2005, 11 pp.

"DynamoRIO Dynamic instrumentation tool platform." Retrieved Nov. 23, 2020 from: https://web.archive.org/web/20171229234624/http://www.dynamorio.org/, accessed date Dec. 29, 2017, 2 pp.

Perkins et al., "Automatically Patching Errors in Deployed Software," in Proceedings of the ACM SIGOPS 22nd symposium on Operating systems principles, SOSP'09, Oct. 11-14, 2009, 16 pp.

Klima, "Tunnels in hash functions: MD5 collisions within a minute," IACR Cryptology ePrint Archive, Version 2, Apr. 2006, 17 pp.

Sasaki et al., "Finding Preimages in Full MD5 Faster than Exhaustive Search," Springer, in Annual International Conference on the Theory and Applications of Cryptographic Techniques, Apr. 26, 2009, pp. 134-152.

"Openssl: Cryptography and SSL/TLS Toolkit," OpenSSL Software Foundation, Retrieved Nov. 23, 2020 from: https://web.archive.org/web/20171230171125/https://www.openssl.org/, accessed date Dec. 30, 2017, 2 pp.

"LIBGCRYPT," OpenSSL Software Foundation, Retrieved Nov. 23, 2020 from: https://web.archive.org/web/20181228123259/https://www.gnupg.org/software/libgcrypt/index.html, accessed date Dec. 28, 2018, 2 pp.

Yadegari et al., "Bit-Level Taint Analysis," in Proceedings of 2014 IEEE 14th International Working Conference on Source Code Analysis and Manipulation (SCAM), Sep. 28-29, 2014, 10 pp.

"SSL library mbed tls / polarssl" ARM Limited, ARMmbed, Retrieved Nov. 23, 2020 from: https://web.archive.org/web/20161208040135/https://tls.mbed.org/, Accessed date Dec. 8, 2016, 1 pp.

"Network security services," Mozilla, MDN web docs, Retrieved Nov. 23, 2020 from: https://web.archive.org/web/20191229232133/https://developer.mozilla.org/en-US/docs/Mozilla/Projects/NSS, Accessed date Dec. 29, 2019, 6 pp.

Lighttpd contributors, "Lighttpd—fly light." https://www.lighttpd.net/, 2018, retrieved from https://web.archive.org/web/20180624103843/https://www.lighttpd.net/ 51 pgs.

"Libcurl—the multiprotocol file trasfer library," Curl Contributors, Retrieved Nov. 19, 2020 from: https://web.archive.org/web/20181221031615/https://curl.haxx.se/libcurl/, Accessed date Dec. 21, 2018, 2 pp.

(56) References Cited

OTHER PUBLICATIONS

"Binary patching from python," Github, lunixbochs/patchkit, Retrieved Nov. 23, 2020 from:https://web.archive.org/web/20190325030451/https://github.com/lunixbochs/patchkit, Accessed date Mar. 25, 2019, 4 pp.

Franks et al., "HTTP Authentication: Basic and Digest Access Authentication," Network Working Group: RFC 2617, Jun. 1999, 34 pp.

"Keystone: The Ultimate Assembler." Retrieved Nov. 19, 2020, from https://web.archive.org/web/20191009033457/http://www.keystone-engine.org/, Accessed date Oct. 9, 2019, 19 pp.

Shoshitaishvili et al., "SOK: (State of) The Art of War: Offensive Techniques in Binary Analysis," in Proceedings of 2016 IEEE Symposium on Security and Privacy (SP), May 22, 2016, pp. 138-157.

Saudel et al., "Triton: Framework d'execution concolique et d'analyses en runtime," in Symposium sur la sécurité des technologies de l'information et des communications SSTIC 15', France, Rennes, Jun. 3-5, 2015, 197 pp.

"The Apache HTTP Server Project," The Apache Software Foundation, Retrieved Nov. 19, 2020 from: https://web.archive.org/web/20191001040748/https://httpd.apache.org/, Oct. 1, 2019, 2 pp.

Elkins et al., "The mutt e-mail client." Retrieved Nov. 21, 2020 from: https://web.archive.org/web/20191001074356/http://www.mutt.org/, Last Updated Sep. 21, 2019, 4 pp.

Leurent et al., "SHA-1 is a Shambles : First Chosen-Prefix Collision on SHA-1 and Application to the PGP Web of Trust" Retrieved from: https://eprint.iacr.org/2020/014, Last revised Jul. 26, 2020, 45 pp.

Li et al., "A Large-Scale Empirical Study of Security Patches," in Proceedings of the 2017 ACM SIGSAC Conference on Computer and Communications Security, CCS '17, Oct. 30-Nov. 3, 2017, 15 pp.

Edwards et al., "Vulcan: Binary Transformation in a Distributed Environment," Microsoft Research, Tech. Report MSR-TR-2001-50, Apr. 20, 2001, 12 pp.

Andriesse et al., "An In-Depth Analysis of Disassembly on Full-Scale x86/x64 Binaries," in the Proceedings of the 25th USENIX Security Symposium, Aug. 10-12, 2016, 18 pp.

Sermersheim, "Lightweight Directory Access Protocol (LDAP): The Protocol," Network Working Group: RFC 4511, Jun. 2006, 68 pp.

Calzavara et al., "Postcards from the Post-HTTP World: Amplification of HTTPS Vulnerabilities in the Web Ecosystem," in Proceedings of 2019 IEEE Symposium on Security and Privacy (SP), May 19, 2019, pp. 281-298.

\* cited by examiner

| INPUT MACHINE CODE 602 | PATCHED MACHINE CODE 604 |
|---|---|
| `<main_fn_prologue >:` | `<main_fn_prologue >:` |
| 400629: push rbp | 400629: push rbp |
| 40062a: mov rbp, rsp | 40062a: mov rbp, rsp |
| 40062d: sub rsp, 0x60 | 40062d: sub rsp, 0x90 |
| ... | ... |
| `<call_to_md5 >:` | `<call_to_md5 >:` |
| 400694: call 4004c0 `<strlen@plt >` | 400694: call 4004c0 `<strlen@plt >` |
| 400699: mov rcx, rax | 400699: mov rcx, rax |
| 40069c: lea rdx, [ rbp -0x40 ] | 40069c: lea rdx, [ rbp -0x70 ] |
| 4006９0: lea rax, [ rbp -0x50] | 4006９0: lea rax, [ rbp -0x80] |
| 400694: mov rsi, rcx | 400694: mov rsi, rcx |
| 400697: mov rdi, rax | 400697: mov rdi, rax |
| 40069a: call 400616 `<MD5 >` | 40069a: call 400616 `<MD5 >` |
| ... | ... |
| `<sprintf_loop_body >:` | `<sprintf_loop_body >:` |
| 4006ad: movzx eax, BYTE PTR [ rbp + rax *1 -0x40 ] | 4006ad: movzx eax, PTR [ rbp + rax *1 -0x70 ] |
| 4006b2: movzx eax, al | 4006b2: movzx eax, al |
| 4006b5: mov edx, DWORD PTR [rbp -0x54 ] | 4006b5: mov edx, DWORD PTR [rbp -0x84 ] |
| 4006b9: add edx, edx | 4006b9: add edx, edx |
| 4006ba: movsxd rdx, edx | 4006ba: movsxd rdx, edx |
| 4006bd: lea rcx, [ rbp -0x30 ] | 4006bd: lea rcx, [ rbp -0x50 ] |
| 4006c1: add rcx, rdx | 4006c1: add rcx, rdx |
| ... | ... |
| 4006d3: call 400500 `<sprintf@plt >` | 4006d3: call 400500 `<sprintf@plt >` |
| `< sprintf_loop_condition >:` | `< sprintf_loop_condition >:` |
| 4006d9: add DWORD PTR [rbp -0x54 ], 0x1 | 4006d9: add DWORD PTR [rbp -0x84 ], 0x1 |
| 4006dc: cmp DWORD PTR [rbp -0x54 ], 0xf | 4006dc: cmp DWORD PTR [rbp -0x84 ], 0xf |
| 4006e0: jle 4006a9 `<main +0x7f >` | 4006e0: jle 4006a9 `<main +0x7f >` |
| ... | ... |
| `<printf_loop_body >:` | `<printf_loop_body >:` |
| 4006eb: mov eax, DWORD PTR [rbp -0x54 ] | 4006eb: mov eax, DWORD PTR [rbp -0x84 ] |
| 4006ee: cdqe | 4006ee: cdqe |
| 4006f0: movzx eax, BYTE PTR [ rbp + rax *1 -0x40 ] | 4006f0: movzx eax, PTR [ rbp + rax *1 -0x70 ] |
| 4006f5: movzx eax, al | 4006f5: movzx eax, al |
| 4006f9: mov esi, eax | 4006f9: mov esi, eax |
| 4006fa: mov edi, 0x4007d4 | 4006fa: mov edi, 0x4007d4 |
| 4006ff: mov eax, 0x0 | 4006ff: mov eax, 0x0 |
| 400704: call 4004e0 `<printf@plt >` | 400704: call 4004e0 `<printf@plt >` |
| `<printf_loop_condition >:` | `<printf_loop_condition >:` |
| 400709: add DWORD PTR [rbp -0x54 ], 0x1 | 400709: add DWORD PTR [rbp -0x84 ], 0x1 |
| 40070d: cmp DWORD PTR [rbp -0x54 ], 0xf | 40070d: cmp DWORD PTR [rbp -0x84 ], 0xf |
| 400711: jle 4006eb `<main +0xc2 >` | 400711: jle 4006eb `<main +0xc2 >` |

FIG. 6B

| Primitive | Name | Constant Type | Constant Values |
|---|---|---|---|
| Cryptographic Hash Functions | MD2 | S-Box | 2922e43e9... |
| | MD5 | IVs | 01234567, ..., 76543210 |
| | SHA1 | IVs | 01234567, ..., f0e1d2c3 |
| | SHA-256 BLAKE2s | IVs | [67e60{}0a, ..., 19cdcd95b] |
| | SHA-512 BLAKE2b | IVs | [08c9bcf367ed00a, ...] |
| Block Ciphers | RC2 | S-Box | d9789bc4... |
| | RC5 | Magic Constant (P) | 0b2aed8a... |
| | Blowfish | S-Box | 8863f24... |
| | DES | S-Box or SP-trans | 0c04040f01... or 00080802... |
| | AES | S-Box | 637c7776b... |
| Elliptic Curves (Signatures & Key Exchange) | NIST-P192 | Prime, Base Point x | ffffffff..., 188da80e... |
| | NIST-P224 | Prime, Base Point x | ffffffff..., b70e0cbd... |
| | NIST-P384 | Prime, Base Point x | ffffffff..., aa87ca22... |
| | NIST-P256 | Prime, Base Point x | ffffffff..., 6b17d1f2... |
| | NIST-P512 | Prime, Base Point x | ffffffff..., b70e0cbd... |

FIG. 9

1002
```
{
    "name": "sha1",
    "text_contain": [
        "01234567",
        "89abcdef",
        "fedcba98",
        "76543210",
        "f0e1d2c3"
    ],
    "text_not_contain": [],
    "rodata_contain": [],
    "rodata_not_contain": [],
    "secure": false,
}
```

1004
```
{
    "name": "md2",
    "text_contain": [],
    "text_not_contain": [],
    "rodata_contain": [
        "292e43c9a2d87c013d3654a1ecf0061362a705f3c0c773
        8C98932bd9bc4c82ca1e9b573cfdd4e01667426f188a17e512be4ec
        4d6dagede49a0fbf58ebb2fee7aa968799115b2073f94c210890b22
        5f21807f5d9a5a903227353ecce7bff79703ff1930b348a5b5d1d75
        e922aac56aac64fb838d296a47db676fc6be29c7404f1459d705964
        718720865bcf65e62da8021b6025adaeb0b9f61C46616934407e0f5
        547a323dd51af3ac35cf9cebac5ea262c530d6e85288409d3dfcdf4
        41814d526adc37c86cc1abfa24e17b080cbdb14a7888958be363e86
        de9cbd5fe3b001d39f2efb70e6658d0e4a67772f8eb754b0a314450
        b48fed1f1adb998d339f118314"
    ],
    "rodata_not_contain": [],
    "secure": false,
}
```

FIG. 10

AUGMENTING EXECUTABLES HAVING CRYPTOGRAPHIC PRIMITIVES

CROSS REFERENCE

This application claims the priority benefit of U.S. Provisional Patent Application No. 62/924,779, filed on Oct. 23, 2019, the entire content of which is hereby incorporated by reference.

GOVERNMENT LICENSE RIGHTS

This invention was made with Government support under HSHQDC-16-C-00034 awarded by U.S. Department of Homeland Security. The government has certain rights in the invention.

TECHNICAL FIELD

This disclosure is related to computing systems, and more specifically to augmenting computing system executable programs having cryptographic primitives.

BACKGROUND

Cryptography is an important tool for implementing security services such as confidentiality, integrity, authenticity in many software applications and components. In practice, proper usage and correct implementation of cryptographic primitives can be difficult. For example, vulnerabilities often occur due to misuse of a cryptographic primitive or erroneous implementation of cryptographic primitives. Example vulnerabilities arising from misuse of cryptography include weak and/or broken random number generators, resulting in enabling an adversary to recover the server's private keys. Cryptographic Application Programming Interfaces (APIs) are sometimes inadvertently misused by software developers which may cause applications to be insecure against specific attacks, such as chosen plaintext, an attack of which a typical software developer may be unaware.

SUMMARY

In general, the disclosure describes techniques for safely replacing target cryptographic primitives in executable binary files with other, potentially more secure, cryptographic primitives. The techniques described herein can, in some examples, locate and replace target cryptographic primitives in executable binaries without the need for the source code used to produce the executable binaries or debugging symbols in the executable binaries. Additionally, the context and scope in which such primitives are used within a program can be identified, and the program analyzed to determine the effects of replacing target cryptographic primitives with replacement cryptographic primitives. These effects may extend beyond the replacement cryptographic primitive into the code that uses the results produced by the replacement cryptographic primitive. The executable binary file can be patched with changes to the program necessitated by use of the replacement cryptographic primitive.

The techniques described herein provide one or more technical advantages over existing systems. For example, a computing system that applies the techniques can automatically identify weak or ineffective legacy cryptographic primitives in executable binaries. Further, the target cryptographic primitive can be automatically replaced in the executable binary file with a more secure cryptographic primitive. Such identification and replacement can be done even if the source code, symbol tables and/or build instructions used to produce the executable binary file are not available. This can shorten vulnerability windows in software using cryptographic primitives. The techniques disclosed herein can be implemented in an augmentation system that can automatically provide legacy software with improved cryptographic primitives, thereby providing a practical application of the techniques described herein.

In some examples, a system for augmenting cryptographic executables includes one or more processors; a locator executable by the one or more processors to determine if an executable program in an executable binary file includes a target cryptographic primitive; a patch generator executable by the one or more processors to generate patch instructions in response to a determination by the locator that the executable program includes the target cryptographic primitive, the patch instructions to cause the executable program to execute a replacement cryptographic primitive instead of the target cryptographic primitive; and a rewriter engine to modify, based on the patch instructions, the executable program to generate a modified executable binary file.

In some examples, a method includes receiving, by a computing system having one or more processors, an executable binary file; determining, by the computing system, if an executable program stored in the executable binary file includes a target cryptographic primitive; in response to determining that the executable program includes the target cryptographic primitive, modifying, by the computing system, the executable binary file to cause the executable program to execute a replacement cryptographic primitive instead of the target cryptographic primitive; and outputting the modified executable binary file.

In some examples, a method includes receiving an executable binary file; determining if an executable program in the executable binary file includes a target cryptographic primitive; in response to determining that the executable program includes the target cryptographic primitive, determining a scope of changes to the executable program to cause the executable program to execute a replacement cryptographic primitive instead of the target cryptographic primitive, the scope of changes comprising program code for the target cryptographic primitive, memory locations dependent on the output of the target cryptographic primitive, and logic changes to the program code; and outputting one or more indications of the scope of changes.

The details of one or more examples of the techniques of this disclosure are set forth in the accompanying drawings and the description below. Other features, objects, and advantages of the technique will be apparent from the description and drawings, and from the claims.

BRIEF DESCRIPTION OF DRAWINGS

FIG. 6B illustrates example assembly code resulting from disassembly of a program produced by the example source code of FIG. 1, and patched assembly code after augmentation of the assembly according to techniques described in this disclosure.

FIG. 9 is a table illustrating example constant values used by various cryptographic primitives.

FIG. 10 provides an example of how configuration data may be specified according to techniques described in this disclosure.

DETAILED DESCRIPTION

Many existing software applications include cryptographic primitives to support electronic commerce, application security (e.g., password protection), secure communications, data confidentiality etc. Cryptographic primitives comprise algorithms that may be used as building blocks to implement cryptographic protocols and computer security systems. A cryptographic primitive can be a programmatic algorithm which can include functions, subroutines, methods, inline code, constants, data structures, macros etc. These programmatic algorithms used to implement cryptographic primitives are collectively referred to as routines.

Cryptographic primitives may become more vulnerable over time as improved processor speeds make brute force attacks more feasible and as attackers develop effective techniques to defeat the cryptography. Even after such vulnerabilities are discovered, it may take time before appropriate fixes are applied to existing software. Additionally, for legacy binaries that have been in existence for a long time, the source code may not even be available, making it nearly impossible to provide a source code fix to the cryptographic primitive vulnerability. Even when source code is available, many software providers do not patch cryptography-related vulnerabilities until well after the vulnerability's public disclosure. In view of the above, a large window of time may exist for adversaries to exploit existing vulnerabilities in cryptographic primitives.

Common approaches to replace implementations of weak, vulnerable, and/or broken cryptographic primitives often require modifying (and then recompiling) a program's source code. This can take time and effort and may render it difficult to fix legacy software for which source code may not be available. Disclosed herein is an augmentation framework that can be implemented by a system that automatically augments and replaces weak, vulnerable, and/or broken cryptographic primitives at the binary level.

Figure 1:
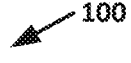
FIG. 1 illustrates example source code that invokes cryptographic primitives and is used to provide context for the techniques described in the disclosure.

FIG. 1 illustrates example source code 100 that invokes cryptographic primitives and is used to provide context for the techniques described in the disclosure. Source code 100 can be compiled to create an executable program. When executed, the program first computes an MD5 digest over an input string. The digest is then converted into a human-readable string, which is then displayed on the screen to the user. MD5 has been shown to be vulnerable to collision and pre-image attacks. As will be discussed below, executable code produced using source code 100 may be augmented to replace the insecure MD5 cryptographic primitive with a more secure cryptographic primitive. Although discussed in the context of the MD5 cryptographic primitive, the techniques described herein can be readily applied to replace other cryptographic primitives. Other examples of cryptographic primitives that may be considered insecure include the MD2, MD4, SHA1, and RIPEMD-160 cryptographic primitives.

Figure 2:
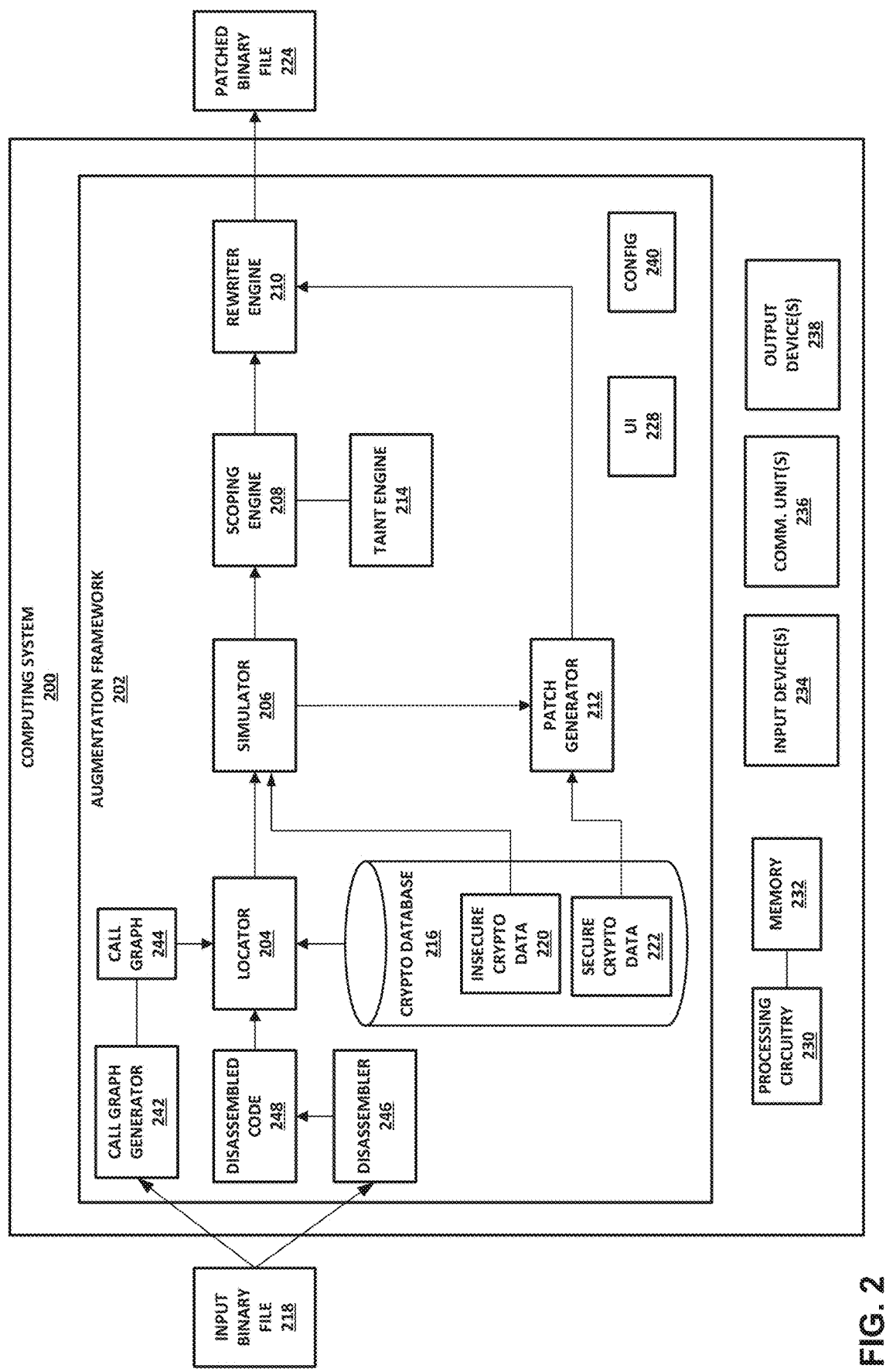
FIG. 2 is a block diagram illustrating a computing system for augmenting executables having cryptographic primitives, in accordance with techniques of the disclosure.

FIG. 2 is a block diagram illustrating a computing system 200 for augmenting executables having cryptographic primitives, in accordance with techniques of the disclosure. Computing system 200 represents one or more computing devices configured for executing an augmentation framework 202. In some aspects, computing system 200 includes processing circuitry 230 and memory 232 that can execute components of augmentation framework 202. Such components may include disassembler 246, locator 204, simulator 206, scoping engine 208, patch generator 212, taint engine 214 and rewriter engine 210 that may form an overall augmentation framework for performing one or more techniques described herein to generate, from an input binary file 218, a patched binary file 224 that causes a computing system to execute a replacement cryptographic included in the patched binary file 224 instead of a cryptographic primitive included in the input binary file 218. As such, patched binary file 224 may be a modified executable binary file based on an input binary file 224 that may be modified using one or more of the techniques described herein. Augmentation framework 202 can receive an input binary file 218 and augment input binary file 218 using the techniques described herein to replace legacy cryptographic primitives with more secure and/or more efficient replacement cryptographic primitives in an output patched binary file 224. For example, an insecure cryptographic primitive such as the MD5 cryptographic primitive may be replaced by the more secure SHA-256 cryptographic primitive.

In some aspects, input binary file 218 and patched binary file 224 can each be an Executable and Link File (ELF) formatted file that may be used in Linux and Unix based operating system environments, for example. The techniques described herein can be applied as well to other binary file formats such as Portable Executable (PE) formatted files that may be used in MICROSOFT® Windows environments or the Mach-0 format used in Mach and OS X environments. Additionally, the techniques may be applied to legacy executable formats such as the Common Object File Format (COFF) (including extended versions XCOFF and ECOFF) and the COM format. In some aspects, input binary file 218 includes machine level instructions using the x86 instruction set architecture (ISA). The techniques described herein can be applied as well to other instruction set architectures.

Figure 3:
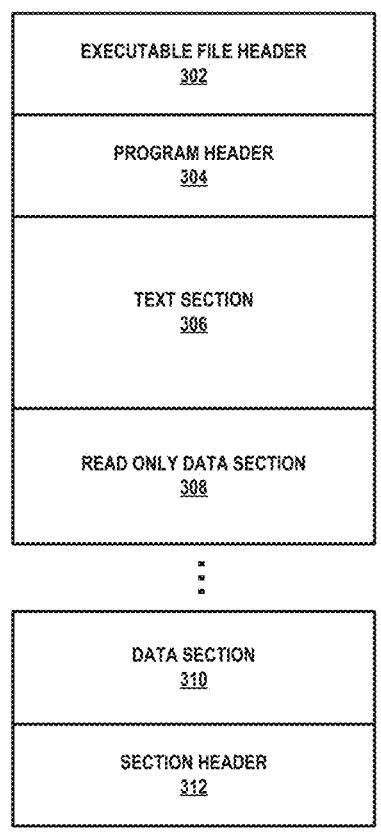
FIG. 3 is a block diagram illustrating a format of an example executable file.

FIG. 3 is a block diagram illustrating a format of an example executable file 300, such as input binary file 218 and patched binary file 224. In some aspects, executable file 300 may have an executable file header 302, a program header 304, and a section header 312. Executable file header includes fields that can describe various aspects of the executable program in the executable file, offsets to the start of program header 304, section header 312 and the entry point address for the executable program.

Program header 304 includes information that can be used when loading the executable program into memory to create a process image for execution by one or more processors. For example, program header 304 can be have include fields to describe segments of the executable binary file 300. Such fields may include a segment type, segment offset in the executable file 300, virtual address of the segment when loaded into memory, physical address of the segment, size of the segment in the executable file 300, size of the segment in memory, etc.

Section header 312 describes sections within the executable file 300. For example, section header 312 may include fields to describe the type of section (program executable, program data, symbol table, relocation information, dynamic linking information etc.) Section header 312 can include fields to describe attributes of the section. Such fields may indicate, among other characteristics, whether the section occupies memory, read/write status of the section, whether the section includes executable instruction or data, is writable when loaded into memory, and processor and operating system dependent information regarding a section. Other fields can include the size of the section, and the offset of the section in the executable file 300. Sections described by a section header 312 can include a text section 306, read-only data section 308, and data section 310. Text section 306 includes executable code for the program contained in the binary file. Read-only data section 308 contains data that is initialized and does not change throughout the execution of the program (i.e., data that is not written by the program). Data section 310 contains data that may be read and written by the program.

Different versions of run-time systems (e.g., loaders, dynamic linkers) may utilize some or all of the information in the sections of an executable file and may interpret the information in different ways. Further, additional sections or fields may be used in some examples.

Returning to FIG. 2, disassembler 246 may read input binary file 218 and disassemble object code in the file into text based disassembled code 248. In some aspects, the angr framework can be used to implement disassembler 246. Details on the implementations of the angr framework can be found in Y. Shoshitaishvili, R. Wang, C. Salls, N. Stephens, M. Polino, A. Dutcher, J. Grosen, S. Feng, C. Hauser, C. Kruegel et al., "Sok:(state of) the art of war: Offensive techniques in binary analysis," in 2016 *IEEE Symposium on Security and Privacy (SP)*. IEEE, 2016, pp. 138-157, which is hereby incorporated by reference herein. Other frameworks and/or tools may be used to disassemble and analyze executable files. Examples of such frameworks and tools include, but are not limited to, Ghidra available from the National Security Agency, the Capstone disassembler, the radare2 debugger framework, the Binary Ninja framework, Valgrind, Pin available from Intel Corporation, and the DynamoRIO tool.

Locator 204 may scan disassembled code 248 and locate cryptographic primitives within the disassembled code. In some aspects, locator 204 may query cryptographic database 216 to obtain insecure cryptographic data 220 that includes information regarding cryptographic primitives that may have security vulnerabilities and for which replacement cryptographic primitives may be available in secure cryptographic data 222. The insecure cryptographic data can include names of insecure cryptographic primitives along with markers that may indicate the presence of an insecure cryptographic primitive. In some aspects, the markers may include constants that are commonly used by cryptographic primitives as part of computing a cryptographic hash of input data. As an example, typical implementations of the MD5 cryptograph primitive use an initialization vector (IV) having known constant values. Other cryptographic primitives may use a substitution box having known constant values. Elliptic curve cryptography can use a prime number and a base point x where the prime number and x are known constants. Table 900 shown in FIG. 9 provides non-limiting examples of constant types and constant values used by various cryptographic primitives that may be used in some implementations.

The markers described above may be considered one type of "signature" of a primitive. Other signatures may be used in addition to, or instead of, the markers described above. For example, a signature library may contain data indicating signatures of cryptographic primitives that have been learned by a machine-learning or other type of algorithm. A database or library (not shown) of software programs may be collected and scanned using a machine-learning or statistical analysis tool to learn the top clusters of how cryptographic algorithms are expressed in machine code of executable binary files. The machine-learning tool or statistical analysis tool may be seeded by the known constants described above or with information obtained from public specifications such as Request For Comments (RFCs). Locator 204 may scan disassembled code 248 for the presence of one or more of the signatures in the database or library to determine that a cryptographic primitive is present in the machine code of executable binary files.

In some aspects, configuration data 240 may be used by locator 204 to determine which legacy cryptographic primitives to identify and the markers to use for identification. FIG. 10 provides an example of how configuration data 240 may be specified. In the example illustrated in FIG. 10, configuration data 240 is in a JavaScript Object Notations (JSON) format. The example includes definitions for a SHA1 cryptographic primitive and an MD2 cryptographic primitive. With respect to the SHA1 cryptographic primitive, the configuration data specifies a "sha1" JSON object 1002, where a "text_contain" field specifies five constants to be found in the text section of an executable file that would indicate the SHA1 cryptographic primitive is used by the program in the input binary file 218. Other configuration fields may be used to specify binary file sections and the data that is to be included or excluded from the sections in order to determine that a cryptographic primitive is present. Further, in the example illustrated in FIG. 10, a "secure" field specifies data that indicates that the corresponding cryptographic primitive is not secure ("secure": false).

With respect to the MD2 cryptographic primitive, the configuration data 240 specifies an "MD2" JSON object 1004, where a "rodata_contain" field specifies a set of data comprising a substitution box to be found in the read-only data section of an executable file that would indicate the MD2 cryptographic primitive is used by the program in the input binary file 218.

Configuration data 240 may contain fewer fields when signatures and/or markers are stored in a database or library as discussed above. For example, the "text_contain" and "rodata"contain" fields may not be included, because signatures from a database or library of signatures may be used as markers instead of the data in the text_contain and rodata_contain fields.

Returning to FIG. 2, locator 204 may search disassembled code 248 for markers indicating the presence of an insecure cryptographic primitive. If a marker indicating the presence of an insecure cryptographic primitive is found in the disassembled code, the routine containing the marker may be flagged as a candidate routine. A candidate routine indicates that the routine may be a cryptographic primitive and that further analysis may be performed to make a more definitive determination whether the flagged routine is in fact a cryptographic primitive. It is sometimes the case that the marker may be in a subroutine or function called by the cryptographic primitive. For example, lines 2-6 of example source code 100 shown in FIG. 1 define a cryptographic primitive "MD5" that calls three subroutines, "MD5Init," "MD5Update," and "MD5Final." The marker may be found in the MD5Init subroutine that initializes the cryptographic primitive for use rather than in MD5, the main code for the cryptographic primitive itself. Locator 204 may thus flag MD5Init as a candidate routine. In this example, MD5Init may be considered a false positive because it may not be the actual cryptographic primitive. MD5 may be considered a false negative, because it may not be flagged as a cryptographic primitive.

In some aspects, false negatives may be reduced or eliminated using a call graph 244. Some implementations include a call graph generator 242 that reads input binary file 218 and generates call graph 244. Call graph 244 may be a data structure that maintains information representing control flow of the program in input binary file 218. As an example, nodes in call graph 244 may represent routines. An edge in call graph 244 from node A to node B indicates that routine A calls routine B. In some implementations, call graph generator 242 may be part of the angr framework noted above.

With respect to the example source code 100, a call graph generator 242 may create a call graph 244 having nodes for MD5, MD5Init, MD5Update and MD5Final, with an edge between MD5 and each of MD5Init, MD5Update and MD5Final indicating that MD5 calls MD5Init, MD5Update and MD5Final. In some aspects, when locator 204 finds a marker in a routine, it also flags the routines calling the routine containing the marker. As part of processing an input binary file 218 resulting from compiling source code 100, locator 204 may flag MD5Init as a candidate routine. Locator 204 may use call graph 244 to determine that MD5 calls MD5Init and flag MD5 as a candidate routine. In some aspects, locator 204 may trace back one level in call graph 244 to flag routines as candidate routines. In some aspects, locator 204 may trace back more than one level to flag routines as candidate routines.

In some aspects, false positives may be reduced or eliminated. As noted above, a false positive may occur when a marker is found in a routine that is not a cryptographic primitive. For example, the marker may be found in an initialization routine called by the cryptographic primitive. Additionally, the marker may not be unique to a particular cryptographic primitive. In some aspects, offline dynamic execution may be used to determine if a candidate routine is a cryptographic primitive. In offline dynamic execution, simulator 206 can set up a stack frame for an identified routine. The stack frame may include parameters for a cryptographic primitive such as parameters that specify known input data and a buffer to receive output data. Simulator 206 can cause the identified candidate routine to be executed with the stack frame created by the simulator 206. In some implementations, simulator 206 may be a dynamic concrete executor that is part of the angr framework or other frameworks noted above.

Locator 204 can compare output data (if any) resulting from execution of the candidate routine with expected output data that a cryptographic primitive would produce when given the known input data. If the output data matches the expected output data, locator 204 can flag the candidate routine as a cryptographic primitive. The flagged routine may be referred to as a target cryptographic primitive indicating that the routine is targeted for replacement by another cryptographic primitive.

Different implementations of a cryptographic primitive may use different parameters and may expect parameters in a different order. For example, some cryptographic primitives receive two parameters, an input buffer to be hashed, and an output buffer to receive the hashed data. Other cryptographic primitives may have three parameters, an input buffer to be hashed, an output buffer to receive the hashed data, and a length of the input buffer. Further, parameters may be specified in different orders by different implementations of a cryptographic primitive. In some aspects, locator 204 or simulator 206 may determine different permutations of parameters and parameter orders, where each permutation of parameters and parameter orders may be considered a candidate parameter set. For example, there may be $3!+2!=8$ different permutations of parameters in examples where a cryptographic primitive may utilize three parameters or two parameters, resulting in eight candidate parameter sets for the target cryptographic primitive. Thus, the following candidate parameter sets may exist:

1. Output, Input
2. Input, Output
3. Output, Input, Length
4. Output, Length, Input
5. Input, Output, Length
6. Input, Length, Output
7. Length, Output, Input
8. Length, Input, Output Stack frames for each of the different parameter sets may be created and the candidate routine may be offline dynamically executed by simulator 206. If the output provided by one of the executions of the candidate routine matches the expected output, locator 204 can flag the candidate routine as a cryptographic primitive. Locator 204 can also save the parameter set (e.g., the permutation of parameters and order of parameters) that resulted in the successful match for later use.

Scoping engine 208 may determine changes to the program and data in disassembled code 248 to replace an insecure cryptographic primitive identified by locator 204 with a replacement cryptographic primitive that may have improved characteristics such as being more secure, more robust, and/or more efficient than the original cryptographic primitive. Scoping engine 208 may identify various types of changes. A first type of change is in the cryptographic primitive itself. Instructions for the routine implementing the target cryptographic primitive may be replaced by instructions of a replacement cryptographic primitive that may implement a more secure hash function. For example, if the MD5 cryptographic primitive is to be replaced with a SHA-256 cryptographic primitive in the binary file produced by source code 100, the instructions in the input binary file 218 corresponding to the MD5 cryptographic primitive (i.e., the instructions starting from address 0x400616) may be replaced with instructions for a routine implementing SHA-256.

A second type of change determined by scoping engine 208 is a change associated with a change in a digest size. The digest size is the size of an output buffer of a routine implementing a cryptographic primitive. For example, MD5 utilizes a sixteen-byte digest size while SHA-256 utilizes a thirty-two-byte digest size. This change in buffer size may affect other memory buffers that consume the output digest. For example, in the example source code 100, the output buffer "digest" is defined at line 12 to be a sixteen-byte buffer. The buffer may need to be enlarged by sixteen bytes so as to be a thirty-two byte buffer to accommodate the larger digest of SHA-256. Scoping engine 208 may determine the location of such changes. Further, scoping engine 208 may determine how such changes may be propagated throughout the disassembled code 248.

In some aspects, scoping engine 208 may utilize a taint engine 214 that performs dynamic taint analysis to determine the scope of changes to a program that would result from replacing a target cryptographic primitive with a replacement cryptographic primitive. As an example, the replacement cryptographic primitive may have a different digest size from the target cryptographic primitive. Thus, the scope of changes may include changes in the sizes of buffers that use the digest. Typically, dynamic taint analysis starts by marking any data that comes from an untrusted source as tainted, and then observes program execution to keep track of the flow of tainted data in registers and memory. A variable may be considered to be tainted if its value depends on data from a tainted source. In some aspects, taint engine 214 identifies memory buffers that are affected and tainted by the output digest of a target cryptographic primitive. In some implementations, taint engine 214 can be provided by the Triton dynamic analysis framework. Details on the Triton framework may be found in F. Saudel and J. Salwan, "Triton: A dynamic symbolic execution framework," in Symposium sur la sécurité des technologies de l'information et des communications, SSTIC, France, Rennes, Jun. 3-5, 2015. SSTIC, 2015, pp. 31-54, which is hereby incorporated by reference herein.

Taint engine 214 may implement various taint policies and rules. A first policy relates to taint introduction. Taint engine 214 may load the program in input binary file 218 into memory and may initialize all memory locations of the program to be non-tainted. Taint engine 214 can execute the program. During execution of the program, taint engine 214 monitors changes of memory or register states. For example, whenever entering the routine implementing the target cryptographic primitive, taint engine 214 may read values in the parameter registers to determine the base address of the output digest. Because the digest size may be well-known and deterministic for any given hash function, taint engine 214 can determine the address range associated with the output digest buffer. Upon exiting the routine, taint engine 214 may assign a taint label to all memory locations of the output digest buffer. In some aspects, taint engine 214 may use one of three taint labels to differentiate whether the memory locations of the output digest buffer are stack-based, dynamically allocated, or statically allocated.

Static memory is typically allocated at compile time before the program is executed. Thus, the location of statically allocated memory is typically in a data section 310 (FIG. 3) of input binary file 218. Such data sections may be ".data" sections or ".bss" (block started by symbol) sections of input binary file 218. Taint engine 214 can determine that the addresses of memory locations of the output digest buffer are statically allocated by checking whether the addresses are within the boundaries of a data section (e.g., a .data section or .bss section). Such memory locations can be assigned a taint label indicating static allocation.

With respect to dynamically allocated memory, taint engine 214 can trace dynamic memory allocation by intercepting a call to a memory allocation routine. Examples of such memory allocation functions include the malloc( ) calloc( ) and realloc( ) routines typically provided in C language and other software environments. Upon intercepting a call to a memory allocation routine, taint engine 214 can learn the size of allocated memory by reading the value of parameter registers associated with the call to the memory allocation routine. Upon exiting the memory allocation routine, taint engine 214 can learn the base address of the allocated memory via the return value of the memory allocation routine. Taint engine 214 can use the base address of the allocated memory along with the size of the allocated memory to determine whether memory at a given location is allocated from a memory area reserved for dynamic allocation (sometimes referred to as heap memory). If the memory is allocated from a memory area reserved for dynamic allocation, taint engine 214 can assign a label to the memory location indicating it is dynamically allocated memory.

With respect to stack-based allocation, in some aspects, taint engine 214 may maintain stack related information associated with the execution of the program using a shadow stack. For example, after executing a "call" instruction, taint engine 214 may push onto the shadow stack the current stack pointer and an address of the next instruction. Upon return from the called routine (e.g., by a "ret" instruction), taint engine 214 may pop the shadow stack. Taint engine 214 may use information on the shadow stack to reconstruct stack frames at any point during the taint analysis. Taint engine 214 may determine whether memory at a given address is on the stack by checking the memory location against memory locations of all stack frames as determined using the shadow stack.

Taint engine 214 can implement taint rules to propagate taint labels to memory locations whose values depend on the tainted memory locations determined as described above. In some aspects, the taint rules can be enforced at word level. For example, if a bit in a word is tainted, the whole word may be labeled as tainted. In some aspects, more precise granularity such as byte-level or bit-level taint rules may be utilized.

In some aspects, the taint rules include a "taint-through-pointer" rule. This rule may handle the situation where a register A is tainted and a register B is assigned with a reference to the tainted value (i.e., B:=*A). In such aspects, B is labeled as tainted in addition to A. This rule may accurately capture data flow in common usages of a hash function. An example of this type of usage may be found at line 20 of source code 100 where the raw digest value is converted to a human-readable format via a lookup table using the "sprint" function.

Taint engine 214 may thus determine and assign taint labels to memory locations affected by the output digest. In some aspects, after taint engine 214 has assigned labels to such memory locations, taint engine 214 may aggregate individual tainted memory locations into unified memory buffers. For example, taint engine 214 may consider contiguous memory locations to be a memory buffer if the address range of the contiguous memory locations is at least as long as the target cryptographic primitive's digest size. Taint engine 214 may output the tainted memory locations (e.g., a global address or stack offset), their associated taint types (e.g., statically allocated, dynamically allocated or stack-based allocation), and the address of the instruction that causes the memory location to be tainted (e.g., a call to a dynamic memory allocations routine). The taint engine 214 can assign labels to memory locations associated with an output digest of a cryptographic primitive and memory buffers that are derived from the output digest.

Rewriter engine 210 can utilize the changes identified by scoping engine 208 to determine how to replace the target cryptographic primitive with a replacement cryptographic primitive that may be more secure, more robust, and/or more efficient than the target cryptographic primitive. In some aspects, patched binary file 224 may initially be a copy of input binary file 218. Rewriter engine 210 may use static binary rewriting to apply changes identified by scoping engine 208 to replace the target cryptographic primitive with the replacement cryptographic primitive.

Rewriter engine 210 may rewrite disassembled code 248 to create patched binary file 224 at the routine level. For example, if there is at least one instruction that is identified by scoping engine 208 as needing change in a routine, the rewriter engine 210 may rewrite the routine by creating a new empty section in patched binary file 224. Rewriter engine 210 may apply the changes identified by scoping engine 208 to the routine. Rewriter engine 210 may modify address references in the routine with respect to placement of the new section when loaded into memory for execution. Rewriter engine 210 may insert the entire rewritten routine into the new section of the patched binary file 224. Finally, rewriter engine 210 may replace the first instruction at the entry point of the original routine with an instruction to transfer control flow to the new section. For example, rewriter engine 210 may replace the first instruction at the entry point of the original routine with a "jump" instruction. The foregoing is graphically illustrated in FIG. 4.

Figure 4:
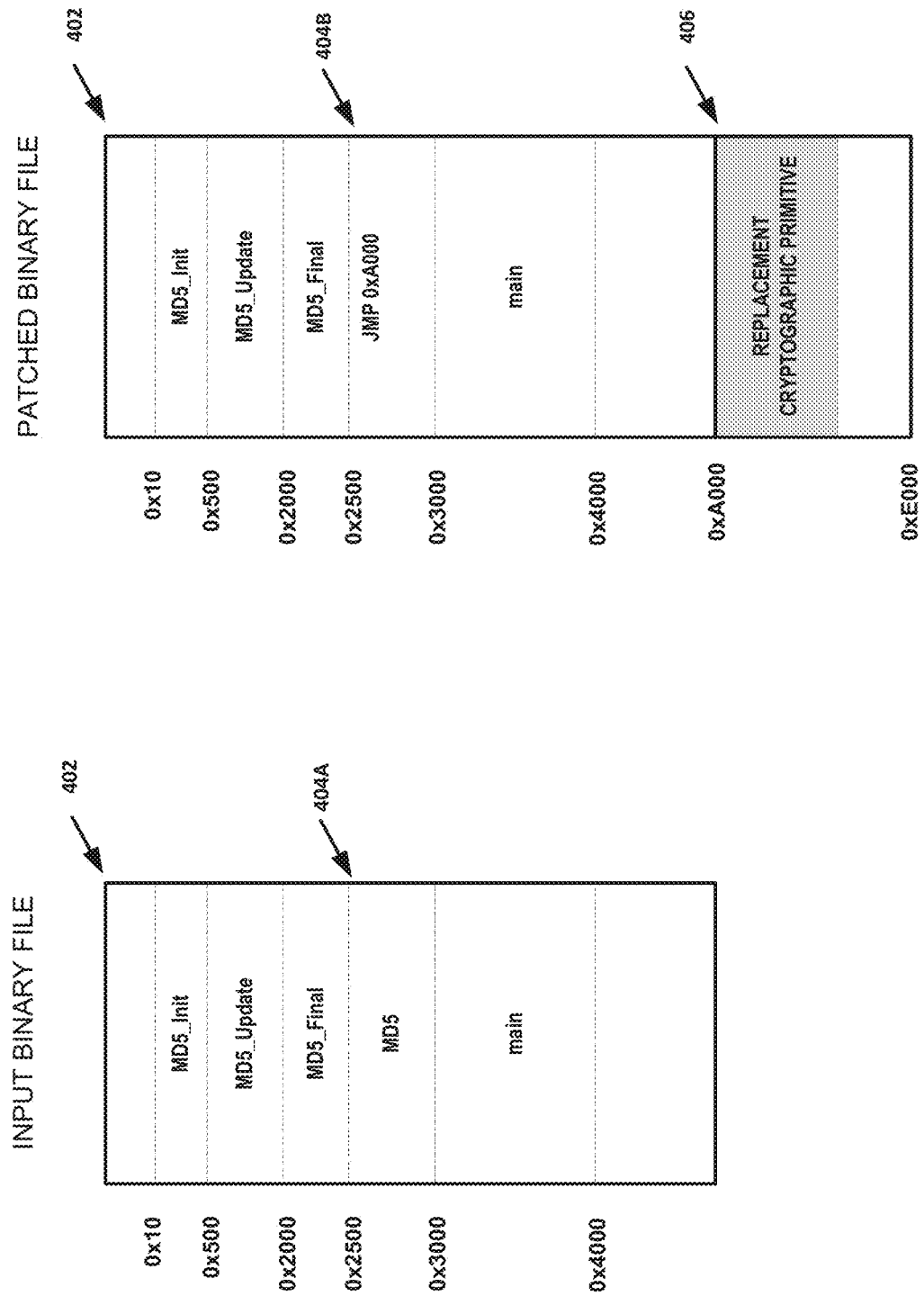
FIG. 4 is a block diagram illustrating additive replacement of a routine such as a cryptographic primitive, according to the techniques described in this disclosure.

FIG. 4 is a block diagram illustrating additive replacement of a routine such as a cryptographic primitive, according to the techniques described in this disclosure. In the example illustrated in FIG. 4, a target cryptographic primitive MD5 in input binary file 218 is replaced with a secure cryptographic primitive in patched binary file 224. A text section (i.e., a code section) of a program in input binary file 218 starts at address 0x0 indicated at 402. The example target cryptographic primitive MD5 has an entry point at address 0x2500 indicated at 404A. MD5 makes calls to the routines MD5 Init, MD5 Update, and MD5 Final at addresses 0x10, and 0x2000 respectively. Using the procedure described above, a new section 406 starting at address 0xA000 may be added in patched binary file 224. The instruction at the entry point 404B of MD5 (address 0x2500) may be replaced by a jump instruction or other transfer of control instruction that causes control flow to proceed at the address of the new section, 0xA000, where the replacement cryptographic primitive is located. Calls to MD5 in main and/or other routines in the program need not be modified. When such a call is made, control flow goes to the original entry point of MD5, and an immediate jump is made to the start of the replacement code at 0xA000. Control flow returns to the next instruction after the call to MD5 upon execution of a return instruction by the replacement cryptographic primitive.

Patch generator 212 may generate a binary patch that includes executable instructions for the replacement cryptographic primitive and code to implement changes identified by scoping engine 208. For example, in some aspects, patch generator 212 may select source code for the replacement cryptographic primitive written in a high level programming language such as the C programming language and compile the source code into an object file. Different versions of the source code for the replacement cryptographic primitive may be available. For example, there may be versions having different parameter sets (e.g., permutations of number of parameters and order of parameters). Patch generator 212 can select the version of the source code having a parameter set that matches the number of parameters and order of parameters of the target cryptographic primitive. Thus, the replacement cryptographic primitive can have the same parameters and the same order of parameters of the target cryptographic primitive determined as described above by locator 204. In some aspects, the different versions of the source code may be precompiled, and the object code corresponding to the source code may be available for selection by the patch generator 212 based on the number and order of parameters.

Although referred to herein as a patch generator, the techniques described herein can be used with any type of program build infrastructure (assemblers, compilers, linkers, loaders etc.).

In some aspects, the source code used to generate the replacement cryptographic primitive may be self-contained. That is, the source code does not rely on external functions and/or libraries. The source code for the replacement cryptographic primitive may statically include versions of external functions to replace external functions. As an example, the replacement cryptographic primitive may make use of the "strlen" function to determine a length of the input buffer. The strlen function is typically provided as part of a C library of functions such as glibc. The source code for the replacement cryptographic primitive may include a replacement for the strlen function with a version that is statically compiled in the source code.

As noted above, in some aspects, a new section is added to patched binary file 224 to store the replacement cryptographic primitive. The source code for the replacement cryptographic primitive may include compiler directives to cause the source code to be compiled with addresses that are relative to the new section that is added to the patched binary file 224. In addition to, or instead of compiler directives, compiler parameters may be provided to cause the compiled code to use addresses relative to the new section.

In some aspects, instruction operands may be located using RIP-relative addressing. A RIP-relative address is an address reference that is provided in the instruction as a signed displacement from the current value of the instruction pointer register. Rewriter engine 210 may edit instructions using RIP-relative addresses by recomputing the relevant displacement based on the address of the new location of the replacement cryptographic primitive. In some aspects, rewriter engine 210 may use the formula below to recompute RIP-relative addresses:

$$\text{new\_disp} = \text{old\_disp} + \text{old\_Inst\_addr} - \text{new\_Inst\_addr}$$

where new_disp is the recomputed displacement for the RIP-relative address, old_disp is the original displacement value in the instruction, old_instr_addr is the address of the instruction in the target cryptographic primitive, and new_Inst_addr is the address of the corresponding instruction in the replacement cryptographic primitive.

Figure 5:
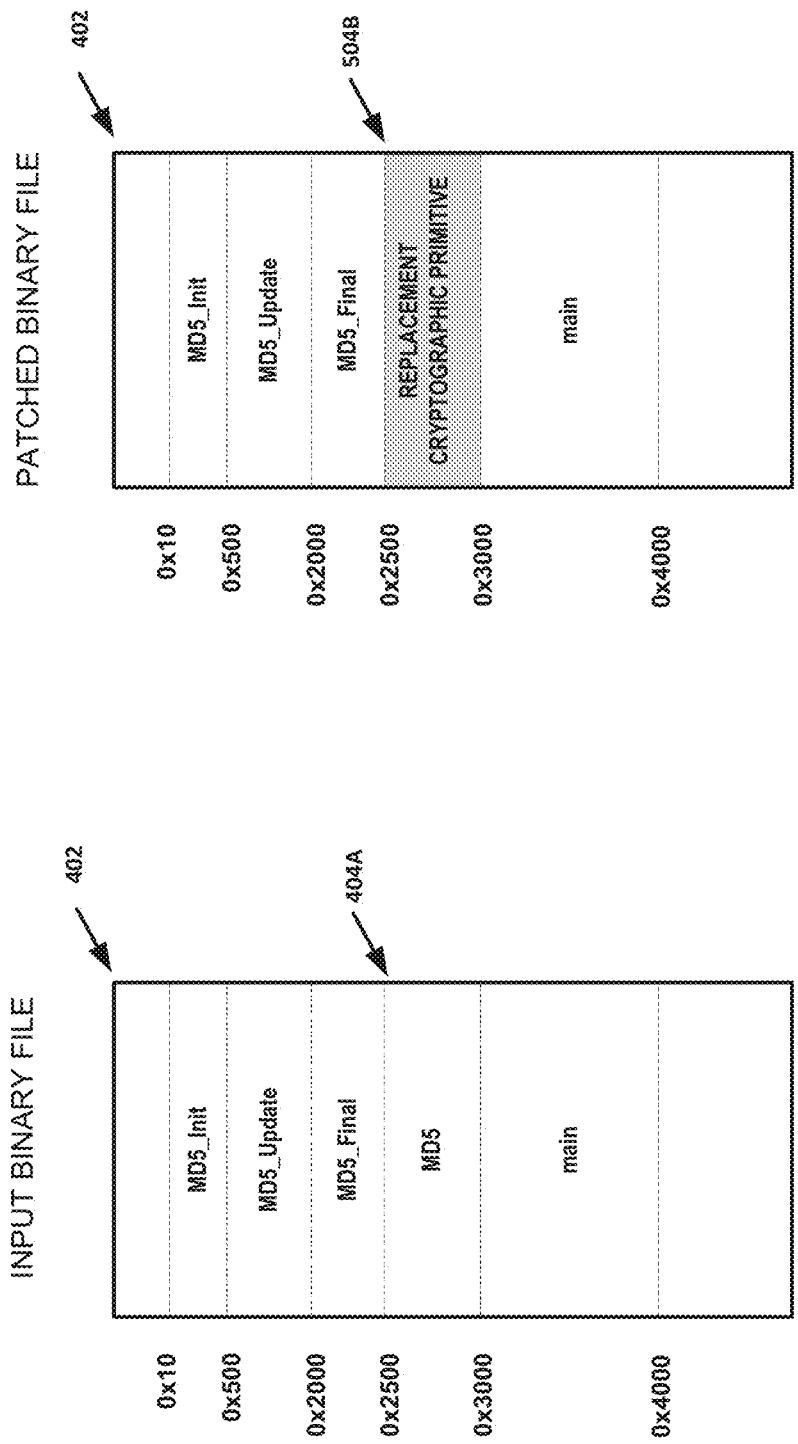
FIG. 5 is a block diagram illustrating in-place replacement of a cryptographic primitive, according to the techniques described in this disclosure.

FIG. 5 is a block diagram illustrating in-place replacement of a cryptographic primitive, according to the techniques described in this disclosure. In some aspects, if the replacement cryptographic primitive is smaller in size than the target cryptographic primitive, the instructions of the target cryptographic primitive may be overwritten with the instructions of the replacement cryptographic primitive. In the example illustrated in FIG. 5, like that in FIG. 4, a target cryptographic primitive MD5 in input binary file 218 is replaced in patched binary file 224 with a replacement cryptographic primitive. A text section of a program in input binary file 218 starts at address 0x0 indicated at 402. The example target cryptographic MD5 has an entry point at address 0x2500 indicated at 404A. The example target cryptographic MD5 includes calls to MD5 Init, MD5 Update, and MD5 Final at addresses 0x10, 0x500, and 0x2000 respectively. In the example illustrated in FIG. 5, a secure hash routine comprising the replacement cryptographic primitive is written to the same starting location of the target cryptographic primitive. As in FIG. 4, calls to MD5 in main or other routines need not be modified, such calls to the original MD5 cause control flow to proceed to the entry point 504B of the replacement cryptographic primitive, which is at the same address as the entry point of the original MD5 cryptographic primitive.

Returning to FIG. 2, the binary code for the replacement cryptographic primitive generated by patch generator 212 may be provided to rewriter engine 210 to replace the target cryptographic primitive as described herein.

As discussed above, scoping engine 208 may identify changes in program code associated with a change in a digest size from the target cryptographic primitive to the replacement cryptographic primitive. For each memory buffer identified by scoping engine 208 as affected by the change in digest size (e.g., a tainted buffer), rewriter engine 210 may compute the new buffer size based on the ratio of the digest sizes of the target cryptographic primitive and that of the replacement cryptographic primitive. This can be represented by the formula:

$$new\_size = old\_size \times [|digestsecure|/|digestnarget|]$$

Rewriter engine 210 may rewrite the patched binary file 224 to support the expanded buffers. Rewriter engine 210 may employ different techniques for each type of buffer (e.g., statically allocated, dynamically allocated, and stack-based buffers).

As noted above, statically allocated buffers are allocated at compile time and occupy a fixed address. Rewriter engine 210 may expand a statically allocated buffer by creating another buffer at a new location. Rewriter engine 210 may modify all instruction operands that access the original buffer to reference the newly allocated buffer. For example, rewriter engine 210 may allocate a new data segment in patched binary file 224 and create a mapping of the address of the original buffer to the address in the new data segment. Rewriter engine 210 may also copy initial values to their new location if the original buffer was allocated in a data segment (e.g., a .data segment). Rewriter engine 210 may scan through all instructions in disassembled code 248 and modify the instructions that contain a reference to the original address by using information obtained from the previously computed address mapping.

With respect to a dynamically allocated buffer, rewriter engine 210 may use the information generated during taint analysis by taint engine 214 to learn where in the program a buffer is dynamically allocated. Rewriter engine 210 may trace back to the instruction that dynamically allocates a buffer, for example, a call instruction to malloc( ) alloc( ) or realloc( ). Rewriter engine 210 may expand the dynamically allocated buffer by updating the parameter register value storing the allocation size information to the new buffer size.

With respect to stack-based allocation of memory buffers, rewriter engine 210 may locate the routine that uses a stack frame that includes the memory buffer. Rewriter engine 210 may enlarge the stack frame to be large enough to hold the buffer(s) at their new increased buffer size and adjust accesses to memory inside the frame according to the increased buffer size(s). Rewriter engine 210 may use the shadow stack described above that may be created during the taint analysis performed by taint engine 214. For example, the shadow stack may be used to locate routines that utilize the digest buffer. Rewriter engine 210 may rewrite instructions that increase and decrease the stack pointer in the prologue and/or epilogue of the located routine. Rewriter engine 210 may iterate through instructions in the routine and inspect the instructions that use the stack offset (e.g., via rsp or rbp registers in the x86 ISA). Rewriter engine 210 may recompute the stack offset with respect to the increased frame size. In some aspects, rewriter engine 210 can determines all instructions that access memory within the target stack frame. If an access lies above a tainted buffer (with respect to the stack pointer), rewriter engine 210 can increment the offset for the memory access by 6, where 6 is a sum of the size difference of all tainted buffers located below the given memory access. Rewriter engine 210 may rewrite those instructions where the newly computed offset differs from the offset of the disassembled code 248.

Figure 6A:
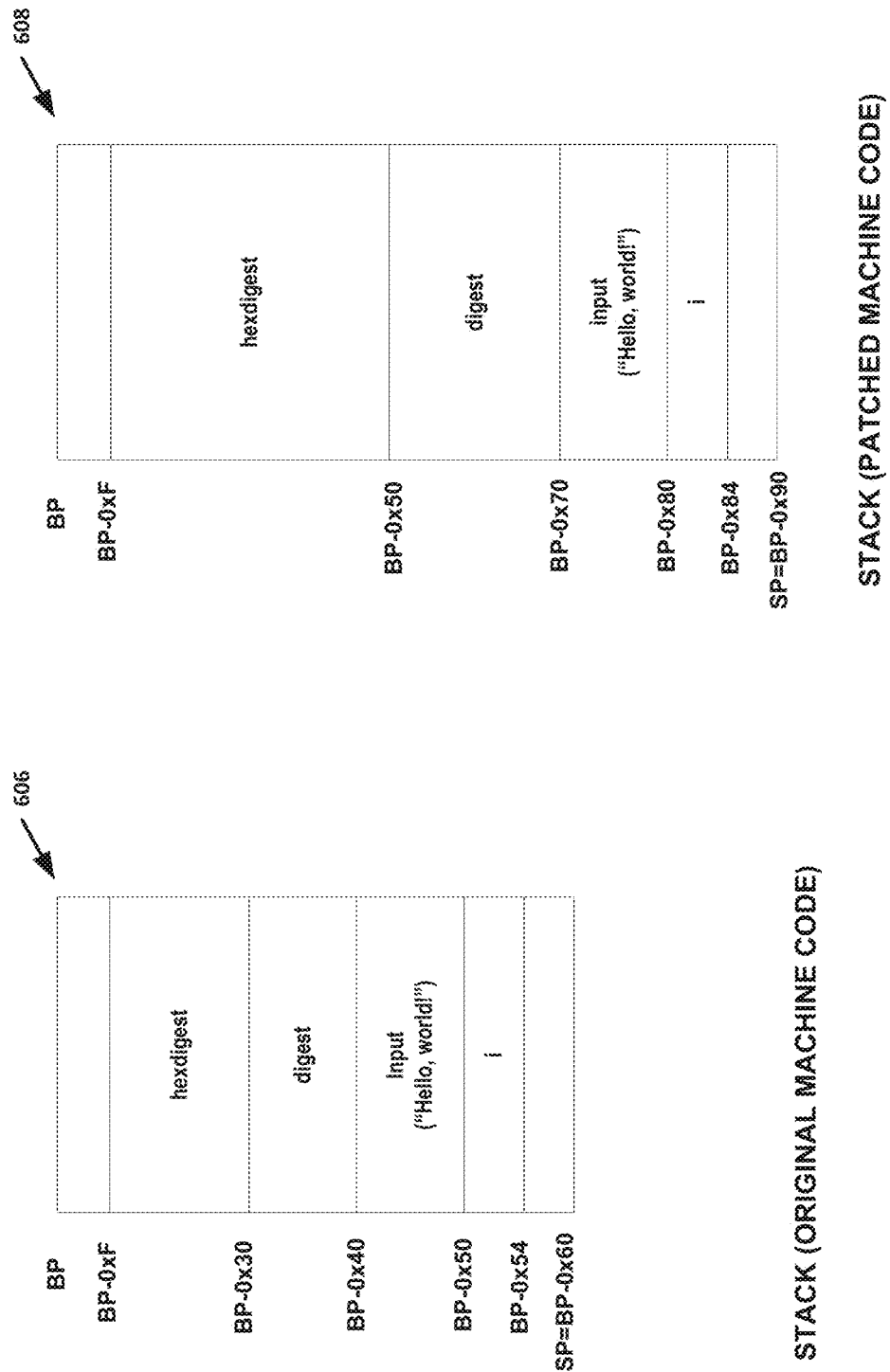
FIG. 6A is a block diagram illustrating changing a stack frame as a result of an increase in a digest size of a replacement cryptographic primitive according to techniques described in this disclosure.

FIG. 6A is a block diagram illustrating changing a stack frame as a result of an increase in a digest size of a replacement cryptographic primitive according to techniques described in this disclosure. In some implementations using the x86 ISA, BP is a base pointer register for the stack and SP is a stack pointer register. The addresses of variables on the stack are provided as a negative offset from the base pointer register value. Stack frame 606 is a graphical representation of a stack frame of the "main" routine of source code 100 (FIG. 1). The main routine has four local variables, input, digest, hexdigest and i. Input is a string that is provided as an input parameter to the MD5 cryptographic primitive. Digest is an output buffer to receive the encoded output resulting of applying the MD5 cryptographic primitive to input. Hexdigest is a string of characters that represents the value of digest in a human readable form. Two characters are required for each value in digest and hexdigest is terminated by a null character, thus hexdigest is twice the size of digest+1. Local variable i is a loop counter used when converting digest to hexdigest. Stack frame 606 shows the addresses of the main routine's local variables within the stack frame when the program is compiled based on source code 100 and executed.

Stack frame 608 shows the addresses of the main routine's local variables after replacement of MD5 with a cryptographic primitive having a digest that is twice the size of the MD5 digest (. e.g., 32 bytes vs 16 bytes). In stack frame 608, the size of the digest buffer has been doubled based on the increased size of the replacement cryptographic primitive's digest. Taint engine 214 may identify hexdigest values as being dependent on the values of digest, and thus tainted by digest. Thus, the allocation of memory in the stack frame for hexdigest may also be increased in size. Values for variables input and i are not dependent on values from digest, thus no changes in their respective sizes are needed. However, their respective positions within the stack frame may be changed as indicated in FIG. 6A based on the increase in stack memory allocated to digest and hexdigest. For example, the stack offset for input increases by 48 bytes (0x30 bytes) from BP-0x40 to BP-0x70. Similarly, the stack offset for i increases by 48 bytes from BP-0x54 to BP-0x84.

FIG. 6B illustrates example assembly code resulting from disassembly of a program produced by the example source code of FIG. 1, and patched assembly code after augmentation of the assembly according to techniques described herein. Input machine code 602 is machine code that may be produced by compiling the source code 100 of FIG. 1. Patched machine code 604 is an example of machine code produced after rewriter engine 210 has modified the input machine code 602 to account for an increase in stack-based buffer allocations of sixteen bytes for the digest buffer and thirty-two bytes for the hexdigest buffer. Stack frames 606 and 608 of FIG. 6A correspond to input machine code 602 and patched machine code 604 respectively. Lines of code that have changed are bounded by a dashed box. The original and changed values are highlighted in bold text.

As noted above, the prologue of a routine call typically modifies the stack pointer and base pointer to allocate memory on the stack for local variables of the routine. In this example, rewriter engine 210 increases the stack frame by forty-eight bytes (sixteen bytes for the digest buffer and thirty-two bytes for the hexdigest buffer). This can be seen at address 0x40062D of the machine code prologue for main, where the stack pointer is adjusted by 0x60 bytes in the original input machine code 602, and by 0x90 bytes in the patched machine code 604. The additional 0x30 bytes allocated from the stack in the patched machine code 604 is due to the additional memory used to allocate space for the enlarged digest and hexdigest.

In some aspects, changes in logic as a result of a replacement of a cryptographic primitive may be identified by the augmentation framework 202. For example, in addition to replacing cryptographic primitive routines and changes to variables size and location caused by changes in digest size, there may be changes in logic due to a change in digest size. For example, the loop terminating condition at lines nineteen and twenty-four of source code 100 may be changed from "i<16" to "i<32" as a result of the change in digest size from sixteen bytes to thirty-two bytes. The corresponding loop terminating conditions are compiled into machine code at addresses and 0x40070d of the input machine code 602 as:

cmp DWORD PTR[rbp–0x54],0xf).

Modifying the instruction to:

cmp DWORD PTR[rbp–0x84],0x1f in the patched machine code 604 would provide both the correct stack variable offset and the correct loop terminating condition. It may be difficult for the scoping engine 208 to determine whether the constant 0xf is related to the digest size. In some aspects, changes in program logic that may be related to changes in digest size may be flagged and presented to the user via user interface 228. A user may provide input that can be used by the augmentation framework 202 to determine whether the instruction logic is to be changed.

Returning to FIG. 2, in some implementations, rewriter engine 210 may add information to patched binary file 224 in addition to replacing code for a cryptographic primitive. For example, rewriter engine 210 may add information that summarizes or otherwise describes the changes made to the original input binary file 218 to produce patched binary file 224. Such information may be stored in one or more added metadata sections of patched binary file 224, and may be referred to as a "repair certificate." For example, rewriter engine 210 may add information to record indicators of the changes made to the executable binary file and the operations performed to locate and test primitives, buffers, and do taint tracing and argument semantics derivation. This additional metadata may be used, for example, when further changes are to be made to the executable in the patched binary file 224.

One or more of the components of augmentation framework 202 described above may be executed by processing circuitry 230 from memory 232 operably coupled to processing circuitry 230. Memory 232 may store information for processing during operation of computing system 200. In some examples, memory 232 may include temporary memories, meaning that a primary purpose of the one or more storage devices is not long-term. Memory 232 may be configured for short-term storage of information as volatile memory and therefore not retain stored contents if deactivated. Examples of volatile memories include random access memories (RAM), dynamic random-access memories (DRAM), static random access memories (SRAM), and other forms of volatile memories known in the art. Memory 232, in some examples, also includes one or more computer-readable storage media. Memory 232 may be configured to store larger amounts of information than volatile memory. Memory 232 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 232 may store program instructions and/or data associated with one or more of the components described in accordance with one or more aspects of this disclosure.

Processing circuitry 230 and memory 232 may provide an operating environment or platform for computing system 200, which may be implemented as software, but may in some examples include any combination of hardware, firmware, and software. Processing circuitry 230 may execute instructions and memory 232 may store instructions and/or data of one or more components or modules. The combination of processing circuitry 230 and memory 232 may retrieve, store, and/or execute the instructions and/or data of one or more applications, components, modules, or software. Processing circuitry 230 and memory 232 may also be operably coupled to one or more other software and/or hardware components, including, but not limited to, one or more of the components illustrated in FIG. 2.

Computing system 200 may perform operations for some or all of the components of augmentation framework 202 described herein using software, hardware, firmware, or a mixture of hardware, software, and firmware residing in and/or executing at computing system 200. Computing system 200 may execute each of the component(s) with multiple processors or multiple devices. Computing system 200 may execute one or more of such components as part of a virtual machine or container executing on underlying hardware. One or more of such components may execute as one or more services of an operating system or computing platform. One or more of such components may execute as one or more executable programs at an application layer of a computing platform.

One or more input devices 234 of computing system 200 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 238 of computing system 200 may generate, transmit, or process output. Examples of output are tactile, audio, visual, and/or video output. Output devices 238 may include a display, sound card, video graphics adapter card, speaker, presence-sensitive screen, one or more USB interfaces, video and/or audio output interfaces, or any other type of device capable of generating tactile, audio, video, or other output. Output devices 238 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 200 may include a presence-sensitive display that may serve as a user interface device that operates both as one or more input devices 234 and one or more output devices 238.

One or more communication units 236 of computing system 200 may communicate with devices external to computing system 200 (or among separate computing devices of computing system 340) by transmitting and/or receiving data and may operate, in some respects, as both an input device and an output device. In some examples, communication units 236 may communicate with other devices over a network. In other examples, communication units 236 may send and/or receive radio signals on a radio network such as a cellular radio network. Examples of communication units 236 include a network interface card (e.g. such as an Ethernet card), an optical transceiver, a radio frequency transceiver, a GPS receiver, or any other type of device that can send and/or receive information. Other examples of communication units 236 may include Bluetooth®, GPS, 3G, 4G, and Wi-Fi® radios found in mobile devices as well as Universal Serial Bus (USB) controllers and the like.

User interface 228 is a user interface for computing system 200. User interface 228 may represent a graphical user interface, a command-line interface, one or more APIs, or other interface by which a user may interface with computing system 200.

A user (not shown) may issue an augmentation request to replace an insecure cryptographic primitive in a binary file with a replacement cryptographic primitive. The augmentation request may be received by user interface 228, such as entered via a graphical user interface, entered into a command-line interface, or generated and sent as a communication to invoke one or more methods of a set of APIs.

Figure 7A:
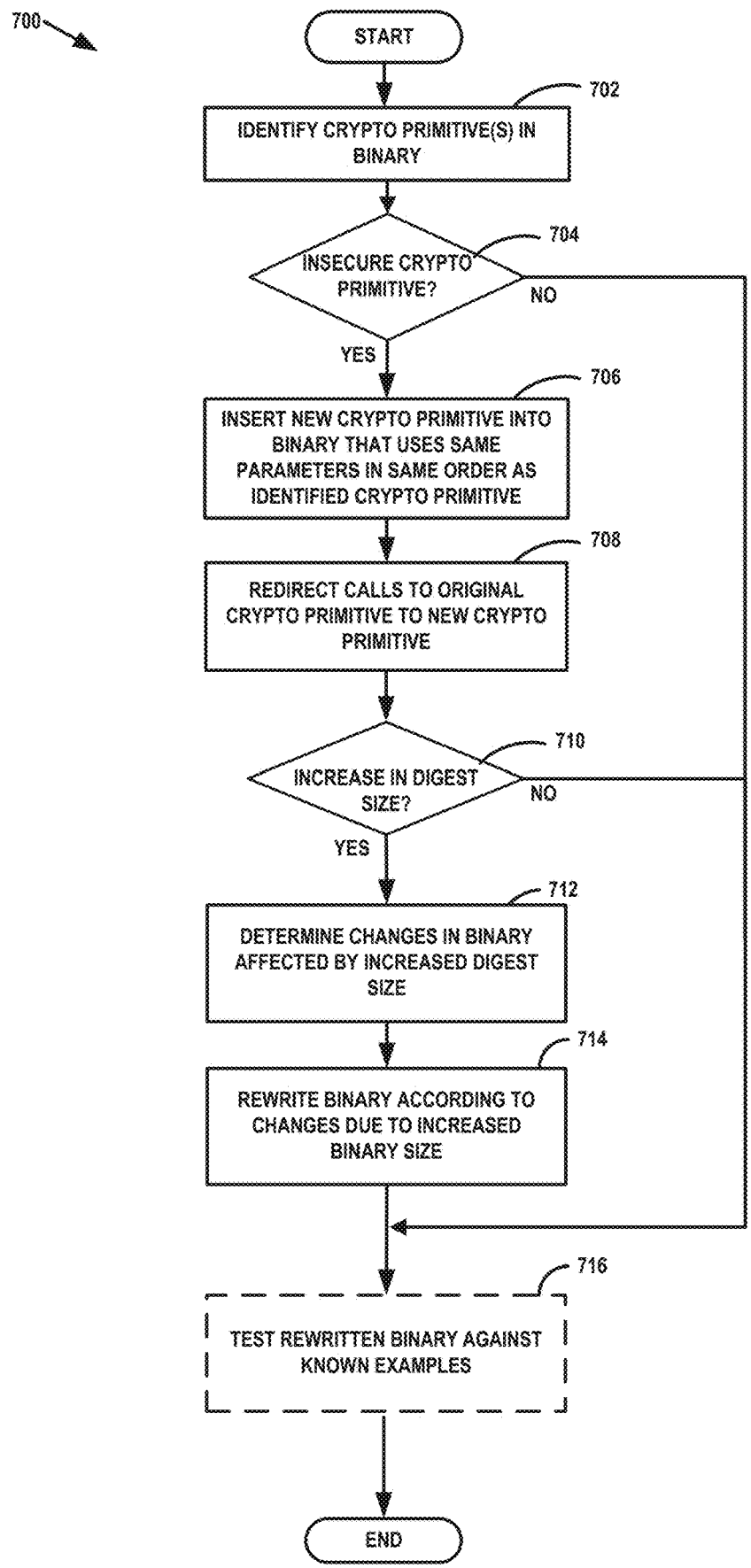
FIG. 7A is a flowchart illustrating example operations of a method for augmenting executables having cryptographic primitives, in accordance with techniques of the disclosure.

FIG. 7A is a flowchart 700 illustrating example operations of a method for augmenting executables having cryptographic primitives, in accordance with techniques of the disclosure. In some aspects, the operations may be performed by one or more components of an augmentation framework 202. Augmentation framework 202 may scan an input binary file containing an executable program to determine if cryptographic primitives that have been identified as insecure are present in the executable program (702). In some aspects, augmentation framework 202 can scan the input binary file to determine if a cryptographic primitive is present in the program contained in the executable binary file (704). The scanning may be performed as described in FIG. 8.

Figure 8:
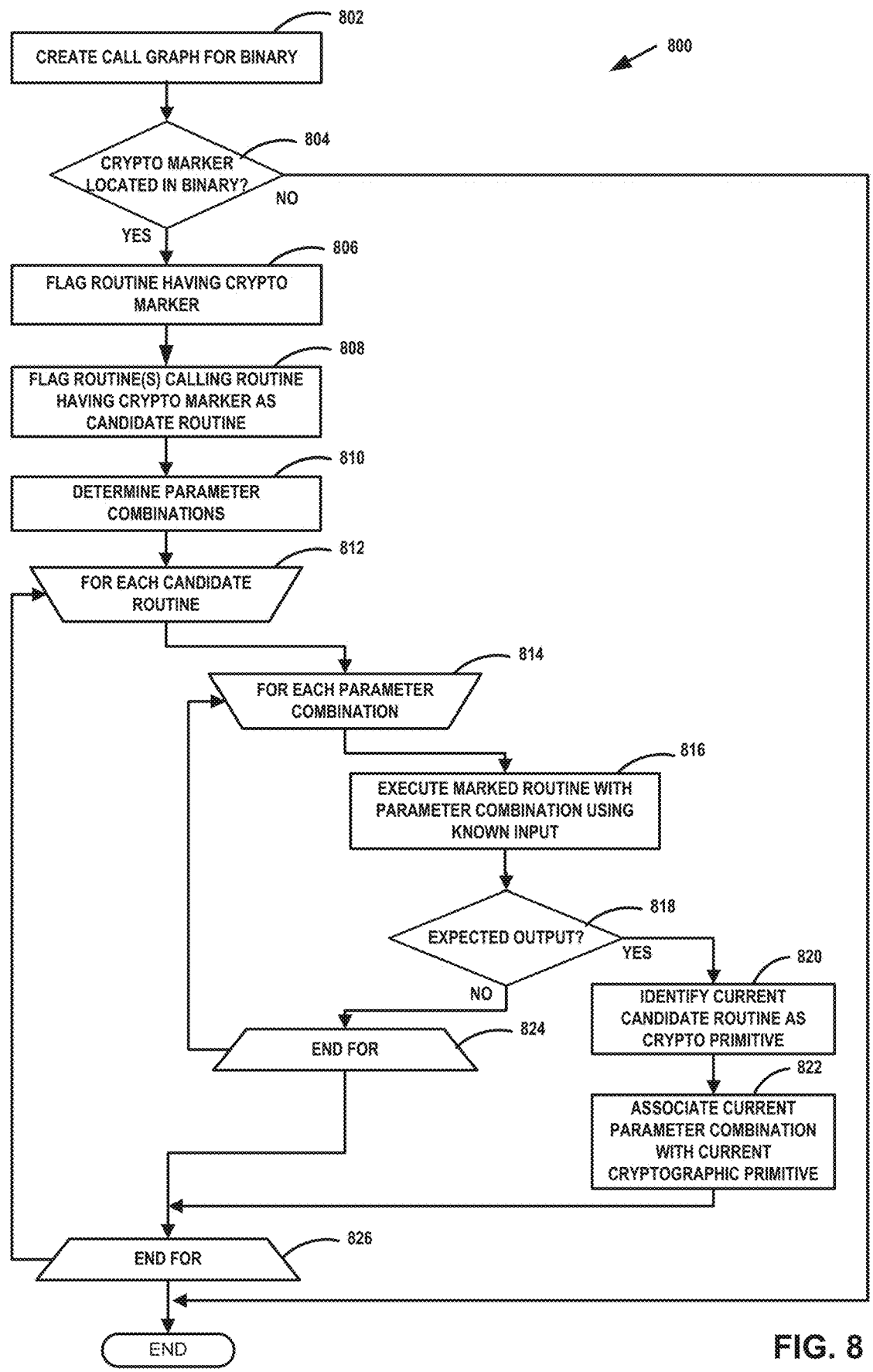
FIG. 8 is a flowchart illustrating example operations of a method for determining whether a cryptographic primitive is in a program contained in an executable binary file according to techniques described in this disclosure.

FIG. 8 is a flowchart 800 illustrating example operations of a method for determining whether a cryptographic primitive is in a program contained in an executable binary file according to techniques described in this disclosure. In some aspects, a call graph generator 242 can create a call graph for the program (802). The call graph can identify control flow through a program with respect to function and/or subroutine calls. number and order of parameters for a cryptographic primitive contained in an executable program in an input binary file. As noted above, augmentation framework 202 may scan code and data sections of the input binary file to determine whether a cryptographic marker comprising one or more constant values that have been identified as being associated with a cryptographic primitive are present in the input binary file (804).

If a cryptographic marker is not present in the input binary file ("NO" branch of 804), the method ends. If a cryptographic marker is present in the input binary file ("YES" branch of 804), augmentation framework 202 flags the routine that includes the cryptographic marker as a candidate routine, i.e., the routine potentially is a cryptographic primitive (806). In some aspects, augmentation framework 202 may flag a routine as a candidate routine by placing the entry point address or other identifier for the routine on a list of candidate routines.

In some aspects, augmentation framework 202 may also flag routines that call the candidate routine having the cryptographic marker as candidate routines (808). As discussed above, a marker may be found in an initialization routine or other routine called by the cryptographic primitive rather than in the main code for the cryptographic primitive. Thus, in order to better ensure that the correct routine is discovered, the routine that calls the candidate routine may also be flagged as a candidate routine.

Cryptographic primitives generally have two or three parameters. For example, a three parameter cryptographic primitive may have two input parameters, the input buffer and the length of the input buffer, and a single output parameter comprising a buffer to contain the digest created based on the input buffer. A two parameter cryptographic primitive may have an input parameter comprising an input data buffer and a single output parameter comprising a buffer to contain the digest created based on the input buffer. The length of the input buffer may be determined by the cryptographic primitive based on a buffer terminator character or other mechanism. Augmentation framework 202 may create different combinations of parameters based on permutations of parameter number and order (810). For example, assuming that the cryptographic primitive has either two or three parameters there may be 3!+2!=8 different possible parameter ordering combinations.

Augmentation framework 202 can iterate through each candidate routine to determine if the candidate routine is a cryptographic primitive (812). For each candidate routine, augmentation framework 202 can iterate through each parameter combination to determine if the parameter combination is a valid parameter combination for a cryptographic primitive (814). Augmentation framework 202 can use simulator 206 to set up a stack frame based on the current combination of parameters. In some aspects, the input buffer parameter is a known set of input data. Simulator 206 can execute the candidate routine using the known set of input data along with the other current parameter(s) (816). Augmentation framework 202 can compare the output buffer with expected output data (818). If the data in the output buffer matches the expected output data ("YES" branch of 818), the candidate routine may be identified as a cryptographic primitive (820). The number of parameters and the order of parameters in the current parameter combination can be associated with the identified cryptographic primitive for later use in selecting a version of a replacement cryptographic primitive (822). Augmentation framework 202 can select the next candidate routine (if any) for testing in a next iteration of candidate routine testing (826).

If the output data does not match the expected output data (or if the candidate routine raises an exception with the current parameters) ("NO" branch of 818), the current candidate routine can be executed using the next parameter combination (if any) in a next iteration (824).

After the current candidate routine has been executed with each parameter combination, the next candidate routine can be selected for testing (826).

Returning to FIG. 7, if an insecure cryptographic primitive is not present in the executable program ("NO" branch of 704), no replacement of a cryptographic primitive may be necessary for the input binary file, and the method ends.

If augmentation framework 202 determines that an insecure cryptographic primitive is present in the executable program ("YES" branch of 704), augmentation framework 202 may insert a replacement cryptographic primitive for a patched binary file that initially is a copy of the input binary file (706). In some aspects, augmentation framework 202 creates a new code section in the patched binary file. The augmentation framework 202 can insert the replacement cryptographic primitive into the new code section. A transfer of control instruction can be inserted that causes control flow to proceed at the replacement cryptographic primitive instead of the target cryptographic primitive (708). For example, a "jump" instruction ("jmp" in the X86 ISA) with a target address of the replacement cryptographic primitive can be inserted at the entry point of the target cryptographic primitive.

In some example implementations, the replacement cryptographic primitive may be inserted into a new code section of the patched binary file irrespective of the size of the code for the replacement cryptographic primitive. In other example implementations, if the code size of the replacement cryptographic primitive is less than that of the target cryptographic primitive, the augmentation framework 202 can insert the code for the replacement cryptographic primitive by overwriting the code for the target cryptographic primitive with the code for the replacement cryptographic primitive such that the entry point address of the replacement cryptographic primitive is the same as the target cryptographic primitive. In such implementations, it is not necessary to redirect execution flow because the entry point of the replacement cryptographic primitive is the same as that of the target cryptographic primitive.

Augmentation framework 202 can determine if the replacement cryptographic primitive returns a larger digest than the target cryptographic primitive (710). If the digest size of the replacement cryptographic primitive is not larger than the target cryptographic primitive ("NO" branch of 710), the method ends.

If the digest size of the replacement cryptographic primitive is larger than the target cryptographic primitive ("YES" branch of 710), the augmentation framework determines changes in the original code of the input binary file that may be needed to account for the increase in digest size (712). For example, buffers used by the original code to hold the digest output of the replacement cryptographic primitive may need to be enlarged to accommodate the new digest size. As discussed above, the changes to the code may depend on how the digest buffer is allocated (e.g., statically allocated, dynamically allocated, or stack-based allocation). The augmentation framework may modify code in the patched binary file according to the identified changes (714).

Optionally, the executable in the patched binary file can be tested against a library or database of files having known cleartext and encrypted versions. The patched executable can receive the cleartext version of data and output encrypted data. The augmentation framework can compare the output encrypted data against the corresponding known encrypted data. If the output encrypted data matches the corresponding known encrypted data, the executable in the patched binary file can be considered correct. If an encrypted output file does not match a corresponding known encrypted version of the file, then the patched binary file is not correct and may not be distributed as a replacement binary file. Similarly, if the patched executable fails during run-time (e.g., fails to complete execution due to a run-time error), then the augmentation framework may indicate that the patched binary file is not correct and should not be distributed as a replacement binary file. If the patched binary file is not correct, the augmentation framework may, automatically or based on user input, repeat the process, making different changes or using different aspects of the techniques described herein to determine modifications to generate a correct replacement binary file.

Figure 7B:
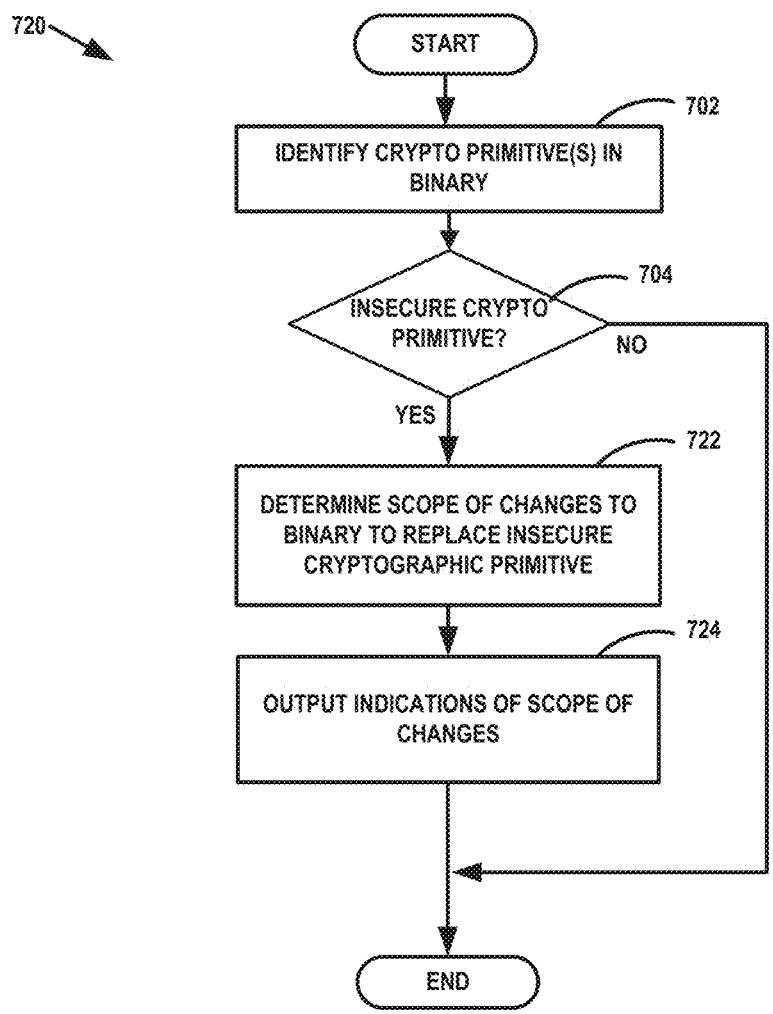
FIG. 7B is a flowchart illustrating example operations of a method for identifying a scope of changes to an executable program to cause the executable program to execute a replacement cryptographic primitive instead of a target cryptographic primitive, in accordance with techniques of the disclosure.

FIG. 7B is a flowchart illustrating example operations of a method for identifying a scope of changes to an executable program to cause the executable program to execute a replacement cryptographic primitive instead of a target cryptographic primitive, in accordance with techniques of the disclosure. In some aspects, augmentation framework 202 may scan an input binary file containing an executable program to determine if cryptographic primitives that have been identified as insecure are present in the executable program (702). In some aspects, augmentation framework 202 can scan the input binary file to determine if a cryptographic primitive is present in the program contained in the executable binary file (704). The scanning may be performed as described above with reference to FIG. 8.

In response to determining that the executable binary file contains an insecure cryptographic primitive, the augmentation framework may determine a scope of changes to the executable program to cause the program to execute a replacement cryptographic primitive. There may be various classifications of changes (722). As a first example, the scope of changes may include the code for the insecure cryptographic primitive. Such changes may be referred to as "C1" changes. As discussed above, the change may be to overwrite the code for the insecure cryptographic primitive with code for a more secure cryptographic primitive, or to bypass the code for the insecure cryptographic primitive by causing control to be transferred from the insecure cryptographic primitive to the more secure cryptographic primitive.

As a second example, the changes may be changes to code in the executable program that depends on the output of the insecure cryptographic primitive. Such changes may be referred to as "C2" changes. In some aspects, such changes may be due to an increased digest buffer size used by the more secure cryptographic primitive. For example, MD5 uses a sixteen byte digest while the more secure SHA-256 uses a thirty-two byte digest. Thus, replacing an MD5 based cryptographic primitive with a SHA-256 based cryptographic primitive may require changes in code that uses the output of the SHA-256 cryptographic primitive by increasing the size of data buffers that receive the output of the SHA-256 cryptographic primitive. As discussed above, such data buffers may be stack-based, dynamically allocated memory, or statically allocated memory.

As a third example, the changes may be changes to logic in the executable program. Such changes may be referred to as "C3" changes. Using the example of a change in digest buffer size described above, there may be loop counters or loop termination conditions used in processing data in the digest buffer. Such loop counters and termination conditions may need to be modified in order to properly process all of the data in the newly enlarged buffer. For example, a loop counter or loop terminating condition may be initially set to sixteen when processing an MD5 digest. The loop counter or termination condition value may need to be increased to thirty-two in order to process a SHA-256 digest.

The augmentation framework may output indications of the scope of changes to an end-user (724). In some aspects, the augmentation framework may generate a report indicating the changes required or recommended to an executable program to replace an insecure cryptographic primitive with a more secure cryptographic primitive. The output of the report may include disassembled code for the executable program, along with annotations or other indicators of how the executable program is to be modified.

In some aspects, the augmentation framework may display the disassembled code in a user interface, with changes highlighted on the display. The display may be accompanied by annotations indicating the change and the classification of the change.

In some aspects, some or all of the changes having particular classifications may be automatically applied upon user request or based on a configuration of the augmentation framework. In some aspects, some or all of the changes having particular classifications may involve interaction with the user to determine if a change associated with the classification is to be applied to an executable binary file. For example, the "C1" and "C2" class of changes described above may be automatically applied based on a user input or augmentation framework configuration. For class "C3" changes, an interface may indicate the proposed C3 change to the user, and provide a means for the user to indicate if the change is to be implemented. As an example, in the case where a digest size is increased from sixteen bytes to thirty-two bytes, instances of the constant value sixteen in the code may be identified as being potentially related to the digest buffer size. However, it is possible that not all instances of the constant value sixteen in the code are related to the digest buffer size and that some instances may be used for a different purpose or for a different buffer. Thus, the augmentation framework may locate and identify such constant values and provide an interface for the user analyze the code and to cause the change to be made or to ignore the indication of a potential change as desired.

In some aspects, the desired changes may be applied (either automatically or at the user's direction) to the executable program. The program may then be tested using known input that produces expected output. If the modified program executes correctly, i.e., the output of the modified program matches the expected output, the changes can be made permanent. In some aspects, if the modified program does not produce the expected output, the changes can be rolled back, and the user may utilize the augmentation framework to make different choices as to the changes to be applied.

In some aspects, the techniques described herein can be applied as a stand-alone computing system which, as described above, can include testing a modified executable to determine if it produces expected output based on known input. In some aspects, the techniques may be applied in client-server environments. For example, a client program may be modified using the techniques described herein. The client program may cryptographically process data for one or more test cases and the server can can provide an indication of whether or not the client program communicated the expected data for the test cases to the server program. Similarly, a server program may be modified using the techniques described herein, and a client program can provide data for one or more test cases to the server program. The server program can cryptographically process the data for the one or more test cases, and the client program may determine, from a response provided by the server program, whether or not the server program correctly processed the test case data.

The techniques described herein have been provided in the context of cryptographic primitives that may be statically included in an application. However, the techniques can be applied as well in other contexts such as dynamic libraries.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:
1. A method comprising:
   storing, by a computing system having one or more processors, to a memory, a replacement cryptographic primitive comprising instructions that implement a cryptographic algorithm that is different from a cryptographic algorithm of a target cryptographic primitive;

receiving, by the computing system, after storing the replacement cryptographic primitive, an executable binary file;

determining, by the computing system, if an executable program stored in the executable binary file includes the target cryptographic primitive;

based on determining that the executable program includes the target cryptographic primitive:

obtaining, by the computing system, from the memory, the replacement cryptographic primitive;

modifying, by the computing system, the executable binary file to include the replacement cryptographic primitive comprising the instructions that implement the cryptographic algorithm to cause the executable program to execute the replacement cryptographic primitive instead of the target cryptographic primitive; and outputting the modified executable binary file.

2. The method of claim 1, wherein modifying the executable binary file comprises replacing an instruction in the target cryptographic primitive in the executable program with a reference to the replacement cryptographic primitive.

3. The method of claim 2, wherein replacing the instruction in the target cryptographic primitive in the executable program with the reference to the replacement cryptographic primitive comprises replacing an instruction at an entry point of the target cryptographic primitive with a transfer of control instruction to an entry point of the replacement cryptographic primitive.

4. The method of claim 1, wherein determining if the executable program stored in the executable binary file includes the target cryptographic primitive comprises:

executing a candidate routine of the executable program using known input data; and determining that the executable program includes the target cryptographic primitive in response to determining that output data of the candidate routine matches expected output data of the target cryptographic primitive for the known input data.

5. The method of claim 1, further comprising:

selecting a parameter set from a plurality of candidate parameter sets comprising permutations of candidate parameters for the target cryptographic primitive;

executing the target cryptographic primitive using the selected parameter set, the selected parameter set including known input data; and determining a number of parameters and an order of parameters in accordance with the selected parameter set in response to determining that output data of the target cryptographic primitive matches expected output data of the target cryptographic primitive for the known input data;

wherein modifying the executable binary file to cause the executable program to execute the replacement cryptographic primitive includes modifying the executable binary file to cause the executable program to execute the replacement cryptographic primitive using the number of parameters and the order of parameters.

6. The method of claim 1, wherein modifying the executable binary file comprises:

determining a first digest of the target cryptographic primitive has a different size than a second digest of the replacement cryptographic primitive;

determining, in the executable program, a memory buffer that stores the first digest; and modifying the executable program to increase a size of the memory buffer to the size of the second digest.

7. The method of claim 6, wherein the memory buffer comprises a statically allocated memory buffer, and wherein modifying the executable program to increase the size of the memory buffer to the size of the second digest comprises:

modifying the executable binary file to allocate a second memory buffer in a data segment of the executable binary file; and replacing one or more references to the memory buffer by instructions in the executable program with references to the second memory buffer.

8. The method of claim 6, wherein the memory buffer is dynamically allocated by the executable program, and wherein modifying the executable program to increase the size of the memory buffer to the size of the second digest comprises:

determining an instruction in the executable program that calls a dynamic memory allocation function allocating memory for the memory buffer; and replacing a size parameter of the dynamic memory allocation function with the size of the second digest to cause the dynamic memory allocation function to allocate the memory buffer in accordance with the size of the second digest.

9. The method of claim 6, wherein the memory buffer is allocated on a stack of the executable program, and wherein the method further comprises:

determining a routine referencing the target cryptographic primitive;

increasing a size of a stack frame of the routine based on a difference between the size of the second digest and the size of the first digest;

determining a first stack offset within the stack frame of a memory location referenced by an instruction of the executable program; and in response to determining that the first stack offset of the memory location is above a second stack offset of the memory buffer, determining a third stack offset based on the difference between the size of the second digest and the size of the memory buffer and replacing the first stack offset in the instruction with the third stack offset.

10. The method of claim 1, wherein modifying the executable binary file comprises replacing, at a storage location occupied by the target cryptographic primitive, instructions of the target cryptographic primitive with the instructions that implement the replacement cryptographic primitive.

11. The method of claim 1, further comprising:

adding, to the executable binary file, one or more indicators of changes to the executable binary file, locations of buffers used by the target cryptographic primitive, operations to locate the target cryptographic primitive, operations to test the target cryptographic primitive, taint tracing operations, or operations to derive cryptographic primitive arguments.

12. A system for augmenting cryptographic executables, the system comprising:

a memory storing a replacement cryptographic primitive comprising instructions that implement a cryptographic algorithm that is different from a cryptographic algorithm of a target cryptographic primitive;

one or more processors;

a locator executable by the one or more processors to determine if an executable program in an executable binary file includes a target cryptographic primitive;

a patch generator executable by the one or more processors to generate patch instructions based on a determination by the locator that the executable program includes the target cryptographic primitive, the patch instructions to cause the executable program to:
obtain, from the memory, the replacement cryptographic primitive; and
execute the replacement cryptographic primitive instead of the target cryptographic primitive; and
a rewriter engine to modify, based on the patch instructions, the executable program to generate a modified executable binary file that includes the replacement cryptographic primitive comprising the instructions that implement the cryptographic algorithm.

13. The system of claim 12, wherein the patch instructions replace an instruction in the target cryptographic primitive in the executable program with a reference to the replacement cryptographic primitive.

14. The system of claim 13, wherein the instruction in the target cryptographic primitive is replaced with a jump instruction to an entry point of the replacement cryptographic primitive.

15. The system of claim 12, further comprising a simulator configured to execute a candidate routine of the executable program using known input data;
wherein the locator is configured to determine that the executable program includes the target cryptographic primitive in response to a determination that output data of the candidate routine matches expected output data of the target cryptographic primitive for the known input data.

16. The system of claim 15, wherein the simulator is further configured to:
select a parameter set from a plurality of candidate parameter sets comprising permutations of candidate parameters for the target cryptographic primitive;
execute the target cryptographic primitive using the selected parameter set, the selected parameter set including known input data; and
determine a number of parameters and an order of parameters in accordance with the selected parameter set in response to a determination that output data of the target cryptographic primitive matches expected output data of the target cryptographic primitive for the known input data;
wherein the patch generator is configured to generate the patch instructions to cause the executable program to execute the replacement cryptographic primitive using the number of parameters and the order of parameters of the selected parameter set.

17. The system of claim 12,
wherein a first digest of the target cryptographic primitive has a different size than a second digest of the replacement cryptographic primitive;
wherein the system further comprises a scoping engine configured to determine, in the executable program, a memory buffer that stores the first digest; and wherein the patch generator is further configured to modify the executable program to increase a size of the memory buffer to the size of the second digest.

18. A method comprising:
storing, to a memory, a replacement cryptographic primitive comprising instructions that implement a cryptographic algorithm that is different from a cryptographic algorithm of a target cryptographic primitive;
receiving, after storing the replacement cryptographic primitive, an executable binary file;
determining if an executable program in the executable binary file includes the target cryptographic primitive;
based on determining that the executable program includes the target cryptographic primitive:
obtaining, from the memory, the replacement cryptographic primitive; and
determining a scope of changes to the executable program to include the replacement cryptographic primitive comprising the instructions that implement the cryptographic algorithm to cause the executable program execute the replacement cryptographic primitive instead of the target cryptographic primitive, the scope of changes comprising program code for the target cryptographic primitive, memory locations dependent on an output of the target cryptographic primitive, and logic changes to the program code; and
outputting one or more indications of the scope of changes.

19. The method of claim 18, further comprising determining a change classification for one or more changes in the scope of changes to the executable program, wherein the change classification comprises one of a cryptographic primitive replacement, a change in buffer size, or a change in logic.

20. A non-transitory computer-readable storage medium having stored thereon instructions that, when executed, cause a processor to:
store, to a memory, a replacement cryptographic primitive comprising instructions that implement a cryptographic algorithm that is different from a cryptographic algorithm of a target cryptographic primitive;
receive, after storing the replacement cryptographic primitive, an executable binary file;
determine if an executable program stored in the executable binary file includes the target cryptographic primitive;
based on a determination that the executable program includes the target cryptographic primitive:
obtain, from the memory, the replacement cryptographic primitive;
modify the executable binary file to include the replacement cryptographic primitive comprising the instructions that implement the cryptographic algorithm to cause the executable program to execute the replacement cryptographic primitive instead of the target cryptographic primitive; and
output the modified executable binary file.

* * * * *